United States Patent
Kawasaki et al.

(10) Patent No.: US 7,352,102 B2
(45) Date of Patent: Apr. 1, 2008

(54) MOTOR

(75) Inventors: Katsuyoshi Kawasaki, Gunma (JP); Hayao Watanabe, Gunma (JP); Yutaka Sasanoi, Gunma (JP)

(73) Assignee: NSK Ltd., Tokyo (JP)

( * ) Notice: Subject to any disclaimer, the term of this patent is extended or adjusted under 35 U.S.C. 154(b) by 52 days.

(21) Appl. No.: 11/698,978

(22) Filed: Jan. 29, 2007

(65) Prior Publication Data
US 2007/0120436 A1 May 31, 2007

Related U.S. Application Data

(60) Continuation of application No. 11/155,567, filed on Jun. 20, 2005, now Pat. No. 7,190,099, which is a division of application No. 10/101,350, filed on Mar. 20, 2002, now Pat. No. 6,930,420.

(30) Foreign Application Priority Data

Mar. 21, 2001 (JP) .............................. P2001-81403
Apr. 11, 2001 (JP) ............................. P2001-113106

(51) Int. Cl.
*H02K 1/06* (2006.01)
(52) U.S. Cl. ....................................... 310/217; 310/89
(58) Field of Classification Search ................. 310/89, 310/216, 217, 254
See application file for complete search history.

(56) References Cited

U.S. PATENT DOCUMENTS

| 2,638,557 | A | * | 5/1953 | Longert ..................... 310/75 R |
|---|---|---|---|---|
| 4,471,250 | A | | 9/1984 | Snider |
| 4,604,541 | A | * | 8/1986 | Murasato et al. ............ 310/180 |
| 4,881,001 | A | * | 11/1989 | Patel et al. .................. 310/258 |
| 5,352,947 | A | | 10/1994 | MacLeod |
| 6,282,053 | B1 | | 8/2001 | MacLeod et al. |
| 6,455,968 | B2 | | 9/2002 | Honorio et al. |
| 6,590,306 | B2 | | 7/2003 | Terada |
| 6,930,420 | B2 | | 8/2005 | Kawasaki et al. |
| 2001/0015586 | A1 | * | 8/2001 | Honorio et al. ................ 310/89 |
| 2002/0117916 | A1 | * | 8/2002 | Terada ....................... 310/75 C |

FOREIGN PATENT DOCUMENTS

| JP | 60-046745 A | 3/1985 |
|---|---|---|
| JP | 11-341716 | 12/1999 |

* cited by examiner

*Primary Examiner*—Thanh Lam
(74) *Attorney, Agent, or Firm*—Sughrue Mion, PLLC

(57) ABSTRACT

Bearings for rotatably supporting a rotor are disposed on an inner side of a hollow cylindrical portion of the rotor which is disposed in a rotating magnetic field formed by a group of stator windings and on an outer periphery of which magnetic poles for generating torque are arranged, thereby shortening the axial length of the rotor and making a motor compact. A motor of the invention includes: a stator in which a plurality of split cores with windings wound therearound are arranged in an annular form to generate a rotating magnetic field; a rotor for generating torque by the rotating magnetic field; and a housing for fixing the stator and for rotatably holding the rotor at an annularly central position of the stator, wherein only one end side of the stator is fixed to the housing.

5 Claims, 19 Drawing Sheets

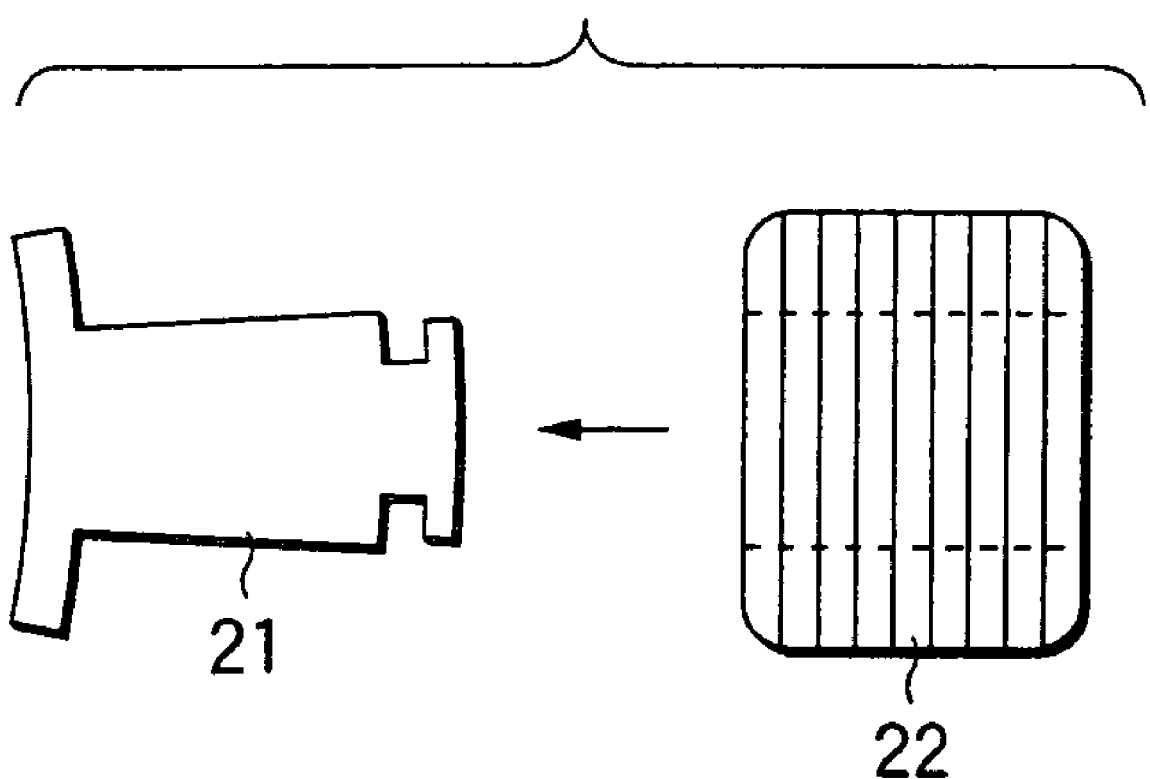

MOTOR

This is a continuation of application Ser. No. 11/155,567 filed Jun. 20, 2005, now U.S. Pat. No. 7,190,099 which is a divisional of application Ser. No. 10/101,350 filed on Mar. 20, 2002 and now U.S. Pat. No. 6,930,420. The entire disclosure of the prior applications, application Ser. Nos. 11/155,567 and 10/101,350, are considered part of the disclosure of the accompanying continuation application and are hereby incorporated by reference.

BACKGROUND OF THE INVENTION

1. Field of the Invention

The present invention relates to a motor for which low vibration, high-accuracy rotation, and high rigidity are required, and more particularly to improvements of a motor using a split-type core for a stator.

2. Description of the Related Art

In the processing of manufacturing semiconductor devices, a polishing apparatus is used for the purpose of planarizing the surface of a substrate or making a thickness thereof uniform. For example, a chemical mechanical polishing (CMP) apparatus is used to planarize a surface of a wafer which is used as a semiconductor substrate. In such a polishing apparatus, in order to effect very fine processing with a total thickness variation on the order of several 10 nm, low vibration, high-accuracy rotation and the like are required for a motor which is used for the polishing apparatus. In addition, the motor requires high rigidity to rotatively drive a turntable of the CMP apparatus, since the motor must withstand a large thrust load at the time when the weight of the turntable is applied to the motor The motor shown in FIG. 17 shows an example of a dc brushless motor which can be used for the polishing apparatus (see FIG. 16 which will be referred to later).

As shown in FIG. 17, a brushless motor 100, if roughly classified, includes a rotor 10, a stator 20, a bearing unit 30, a housing 40, and a detector 50. It should be noted that a description of a control system for driving the motor will be omitted.

The rotor 10 for generating the rotational torque (power) includes a rotating shaft 11 which is hollow for passing the piping and the wiring therethrough as well as a magnet placing portion 12 which is a tubular member provided on a substantially central portion of the rotating shaft 11 and on the outer periphery of which a plurality of magnets 13 are arranged. The stator 20 is formed such that a plurality of split cores 23, which are cores 21 wound around with windings 22 as shown in FIG. 19, are arranged in an annular form as shown in FIG. 18. The cores 21 includes laminated silicon steel sheet. A yoke portion 23 holds the stator 20. The housing 40 includes a left housing 41, a right housing 42, a right-side cover 43, and so on. The left and right housings 41 and 42 clamp and hold the stator 20. In addition, the left and right housings 41 and 42 rotatably support the rotating shaft 11 via a left bearing 30a and a right bearing 30b of the bearing unit 30, which are respectively disposed on both sides of the magnet placing portion 12, such that the clearance between the pole face 13 of the rotor 10 and an end face of the stator core 21 opposing thereto assumes a predetermined air-gap length. The position detecting encoder 50 for detecting the rotational position of the rotor 10 is provided inside the cover 43. The position detecting encoder 50 includes a rotating disk 51 which is attached to the right-hand side of the rotating shaft 11 and on which markers are formed, a detecting head 52 for generating pulses corresponding to the markers, and so on. An output of the detecting head 52 is supplied to a motor controller, and is used for controlling a rotation of the motor. The motor controller controls a current supplied to the respective windings 22 to generate a rotating magnetic field, thereby causing torque to be produced in the magnets 12 and controlling the rotation of the motor.

The brushless motor 100 is used in the polishing apparatus, as shown in FIG. 16 to be referred to later. A table 110 is fixed to mounting holes (threaded holes) in the rotor 10 by means of bolts. Further, a frame 120 is fixed to mounting holes (threaded holes) in the housing 41. In consequence, the motor 100 turns the table 110 in response to a drive current supplied from the controller.

Further, to facilitate the assembly and facilitate a winding of magnetic field windings and for other similar purposes, there is a case where the core of the stator is formed in a split type. If the winding of coils is effected in a state in which the core is split, alignment winding is possible, so that a multiplicity of windings is made possible. In addition, since the slot opening can be minimized, this arrangement is advantageous in terms of the magnetic circuit, and it is possible to obtain a motor with improved efficiency.

For example, a motor such as the CMP apparatus needs to withstand the large thrust load and needs to high-precisely rotate with a low oscillation and high out-put power. However, with the above-described structure of the motor, the overall arrangement of the motor tends to be elongated in the axial direction. In addition, if an attempt is made to secure a required torque and the like, the radial dimension cannot be made as small as expected. This makes it difficult to make the miniaturization of the apparatus using the motor difficult.

Further, since both sides of the rotating shaft are supported by the bearings of the housing, the structure adopted is such that the heat generated in the winding portions is trapped inside the housing, so that effective dissipation of the heat is difficult.

Further, more if there are variations and the like in the accuracy of parts, when the split cores of the stator provided with the windings are assembled into a cylindrical shape, the split cores cannot be assembled such that the inner and outer peripheries of the stator become completely round. Although the stator is built into the tubular yoke by press fitting or the like, it is not easy to press the stator which is not correctly completely round into the yoke, which can cause a difficulty in assembly and a hindrance.

SUMMARY OF THE INVENTION

It is an object of the invention to provide a motor whose axial dimension is made compact.

It is another object of the invention is to provide a motor which facilitates the dissipation of heat.

Yet another object of the invention is to provide a motor suitable for driving a machine tool and a turntable of a chemical polishing apparatus for a semiconductor.

Further, yet another object of the invention is to provide a motor which facilitates the assembly of the stator using split cores.

To achieve these objects, the motor of the invention is characterized by comprising: a rotor having a magnet portion having magnetic poles arranged annularly with a rotating shaft as a center; a stator formed in an annular shape so as to oppose the magnet portion of the rotor and adapted to generate a rotating magnetic field for rotating the rotor; a housing for holding the stator; and a bearing for mounting the rotor to the housing, wherein at least a portion of the bearing is disposed in such a manner as to be located on an inner side of the magnet portion coaxially in a direction of a rotational axis of the rotor.

By adopting the above-described construction, it becomes possible to shorten an axial dimension of the motor for making the apparatus compact.

In addition, since the radial position of the magnetic poles of the rotor can be set to a relatively high position with respect to the length of the rotating shaft, a high torque can be easily obtained.

In addition, since the structure in which the bearing enters the inner side of the rotor is adopted, the space inside the housing increases, which is advantageous in heat dissipation.

Preferably, the bearing includes a pair of bearings, and an interval between the bearings (L1) is set to be narrower than a width (L2) of the magnet portion in the direction of the rotational axis.

By adopting the above-described construction, it becomes possible to shorten the length of the rotating shaft. Further, since the axial length of the magnetic poles of the rotor can be made relatively large with respect to the axial length of the rotor, the generated torque can be made large.

Preferably, the bearing axially supports the rotating shaft of the rotor on one side of the magnet portion.

By adopting the above-described construction, since the stator and the rotating magnetic pole portions can be separated from one direction without disassembling the bearing portion, it becomes possibility to improve the assembling efficiency and maintainability.

Preferably, the magnet portion includes a magnet supporting member attached to the rotating shaft to support a plurality of magnets, and a cross-sectional shape of the magnet supporting member in the direction of the rotational axis is substantially formed in one of a "T" shape, a "hook" shape, an "inverse L" shape, a horizontal "U" shape, a horizontal "H" shape, and a "J" shape.

By adopting the above-described construction, the bearing portion can be easily disposed on the inner side of the magnet portion.

Preferably, the magnet supporting member is disposed on a side of the rotating shaft which is away from a side thereof where the bearing is provided.

By adopting the above-described construction, it becomes possible to secure a large space for disposing the bearing, and the rotating shaft can be made relatively short by that margin.

Preferably, the bearing is a tapered roller bearing, and a pair of tapered roller bearings are disposed such that their small-diameter sides face of the tapered rollers each other.

By adopting the above-described construction, it becomes possible to withstand a high axial load (thrust load), and to withstand the moment applied to the motor.

Preferably, the bearing is provided on one end side of the rotor, and a rotating-member position detector for detecting the rotational position of the rotor is disposed on another end side of the rotor.

By adopting the above-described construction, the assembly and maintenance of the rotating-member position detector are facilitated.

Preferably, the rotating-member position detector is disposed such that at least a portion thereof is located on an inner side of the magnet portion in the direction of the rotational axis of the rotor.

By adopting the above-described construction, it becomes possible to make the axial length of the rotating shaft relatively short.

Preferably, a rare-earth magnet forms the magnet portion.

By adopting the above-described construction, it becomes possible to secure a high magnetic flux density.

Preferably, the rotating shaft is a hollow shaft which open in the axial direction.

By adopting the above-described construction, it becomes possible to pass the piping and the electric wiring through the rotating shaft, which arrangement is suitable as a driving source for a semiconductor processing apparatus.

Preferably, the stator is inserted into the housing and disposed in an annular form to oppose the magnetic portion, the stator comprises: a plurality of a sprit core for generating the rotating magnetic field, the sprit core including a core and a winding being wound around the core; and an annular portion to fix the sprit core inside thereof in the radial direction of the motor.

By adopting the above-described construction, internal circumference face of the stator is high-precisely formed. Further, the stator is easily inserted into the housing (yoke). Therefore, it makes high-rigidity and low oscillation possible.

The bearing, the magnet portion, and the stator are arranged in that order as viewed from the axis of the rotating axis in a radially outward direction. Alternatively, the bearing, the stator, and the magnet portion are arranged in that order as viewed from the axis of the rotating axis in a radially outward direction. As for a former configuration, it relatively makes a simple construction possible. As for a latter configuration, it is relatively effective to output a high power.

The motor of the invention for attaining the above object comprises: a stator in which a plurality of split cores with windings wound therearound are arranged in an annular form to generate a rotating magnetic field; a rotor for generating torque by the rotating magnetic field; and a housing for fixing the stator and for rotatably holding the rotor at an annularly central position of the stator, wherein only one end side of the stator is fixed to the housing.

By adopting the above-described construction, it becomes unnecessary to fit and mount the entire stator into a yoke, and it suffices to fit only the portion of a limited length on one end side, so that it is possible to obtain a motor with excellent assembling efficiency.

Preferably, the stator is fixed to the housing from another end side of the stator by means of bolts.

By adopting the above-described construction, it becomes possible to obtain a motor having high rigidity.

Preferably, a pressing member is further provided which is disposed at another end side of the stator to clamp the split cores of the stator in cooperation with the housing.

By adopting the above-described construction, it becomes possible to align the stator cores and form them in an integral shape.

Preferably, the pressing member is an annular member for pressing an end face of the other end side of the stator. Alternatively, the pressing member is a member which presses that surface of the stator which extends in a direction of a rotational axis and that surface of the stator which extends perpendicular to the rotational axis.

By adopting the above-described construction, it becomes possible to align the split cores, and the annular stator consisting of the split cores can be formed in a completely round form. Further, firmer fixation of the stator can be expected.

Preferably, the portion of the pressing member for pressing the axial surface of the stator is a tapered surface.

By adopting the above-described construction, the fitting of the pressing member and the stator (split cores) can be facilitated.

Preferably, an intermediate portion of the portion of the pressing member for pressing the axial surface of the stator is hollowed out.

By adopting the above-described construction, the fitting area of the pressing member is reduced to allow slight variation in the dimension of the stator split cores.

Preferably, the pressing member has a structure in which it does not come into contact with a corner portion of the stator.

By adopting the above-described construction, interference between an edge portion of the stator (split cores) and a corner portion of the pressing member is made difficult to occur.

The motor of the invention for attaining the above object, a rotor for generating torque by a rotating magnetic field and including a magnet portion which annually arranges a plurality of magnetic poles with a rotating shaft as a center axis;

a stator in which a plurality of split cores with windings wound therearound arranged in an annular form and being opposed to the magnet portion for generating the rotating magnetic field to rotate the rotor;

a housing for rotatably holding the rotor at an annularly central position of the stator; and a bearing mounting the rotor to the housing, wherein only one end side of the stator is fixed to the housing, and at least a portion of the bearing is disposed in such a manner as to be located on an inner side of the magnet portion coaxially in a direction of a rotational axis of the rotor.

By adopting the above-described construction, it becomes unnecessary to it and mount the entire stator into a yoke, and it suffices to fit only the portion of a limited length on one end side, so that it is possible to obtain a motor with excellent assembling efficiency.

Further, it becomes possible to shorten an axial dimension of the motor for making the apparatus compact.

In addition, since the radial position of the magnetic poles of the rotor can be set to a relatively high position with respect to the length of the rotating shaft, a high torque can be easily obtained.

In addition, since the structure in which the bearing enters the inner side of the rotor is adopted, the space inside the housing increases, which is advantageous in heat dissipation.

Preferably, the bearing is a tapered roller bearing. By adopting the above-described construction, it becomes possible to withstand a high axial load (thrust load), and to withstand the moment applied to the motor.

Preferably, the stator includes a pressing member disposed at the other end side to clamp the split core in cooperation with the housing.

By adopting the above-described construction, it becomes possible to align the stator cores and form them in an integral shape.

Preferably, the motor is used a driving source for driving a turntable of a polishing apparatus for polishing a semiconductor substrate.

The motor of the invention has a short dimension in the direction of the rotational axis and is compact, yields a high torque, withstands a high thrust load and a high moment load, has high rigidity, and is capable of reducing the vibration. Therefore, the motor of the invention is suitable as a driving source for a polishing apparatus requiring precision processing, e.g., as a motor for a turntable.

BRIEF DESCRIPTION OF THE DRAWINGS

FIG. 10 is an explanatory diagram explaining the winding way of the windings in accordance with the eighth embodiment of the invention;

DETAILED DESCRIPTION OF A PREFERRED EMBODIMENTS

Hereafter, a description will be given of the embodiments of the invention with reference to the drawings.

Figure 1:
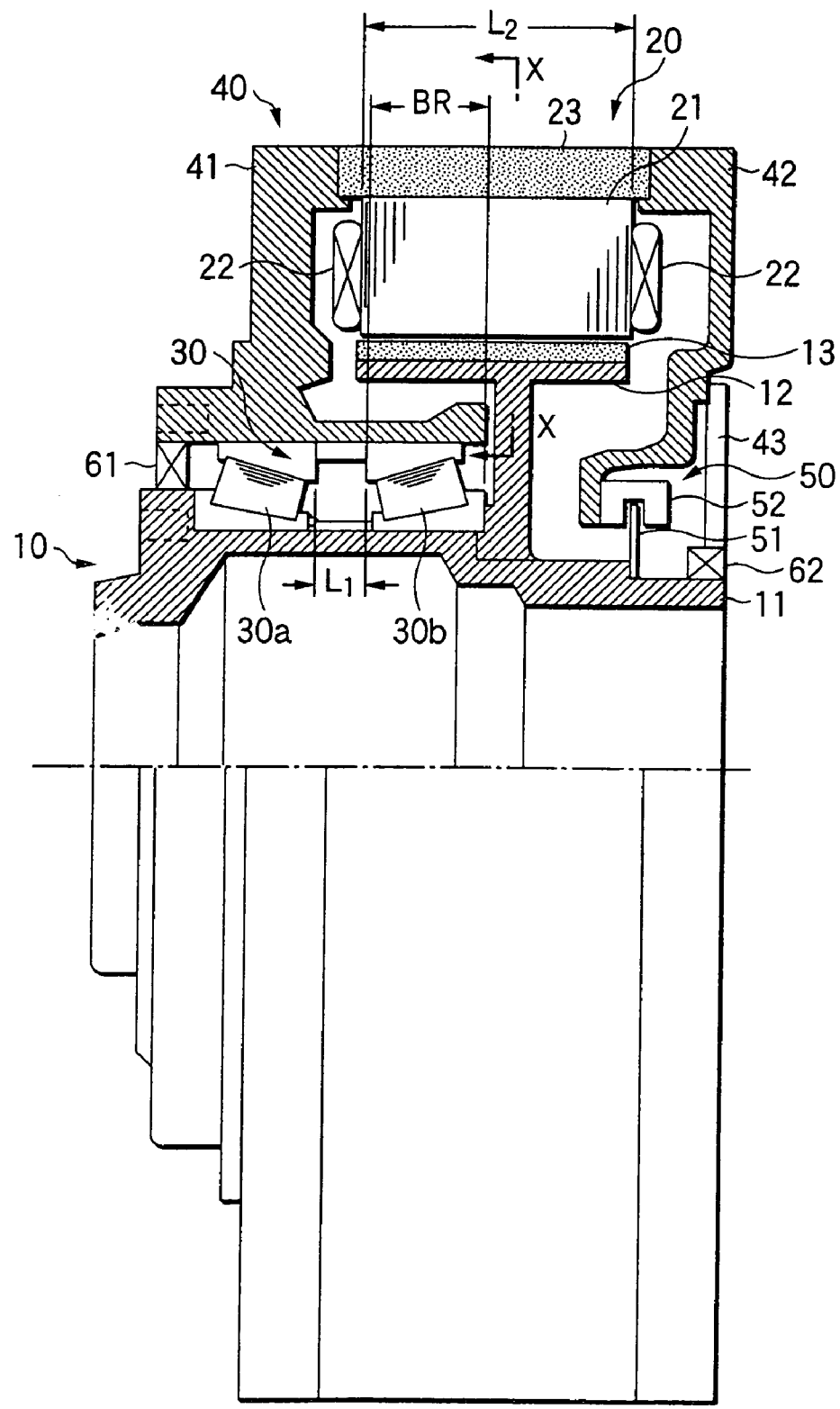
FIG. 1 is a partial cross-sectional view explaining a first embodiment of the invention.
Figure 17:
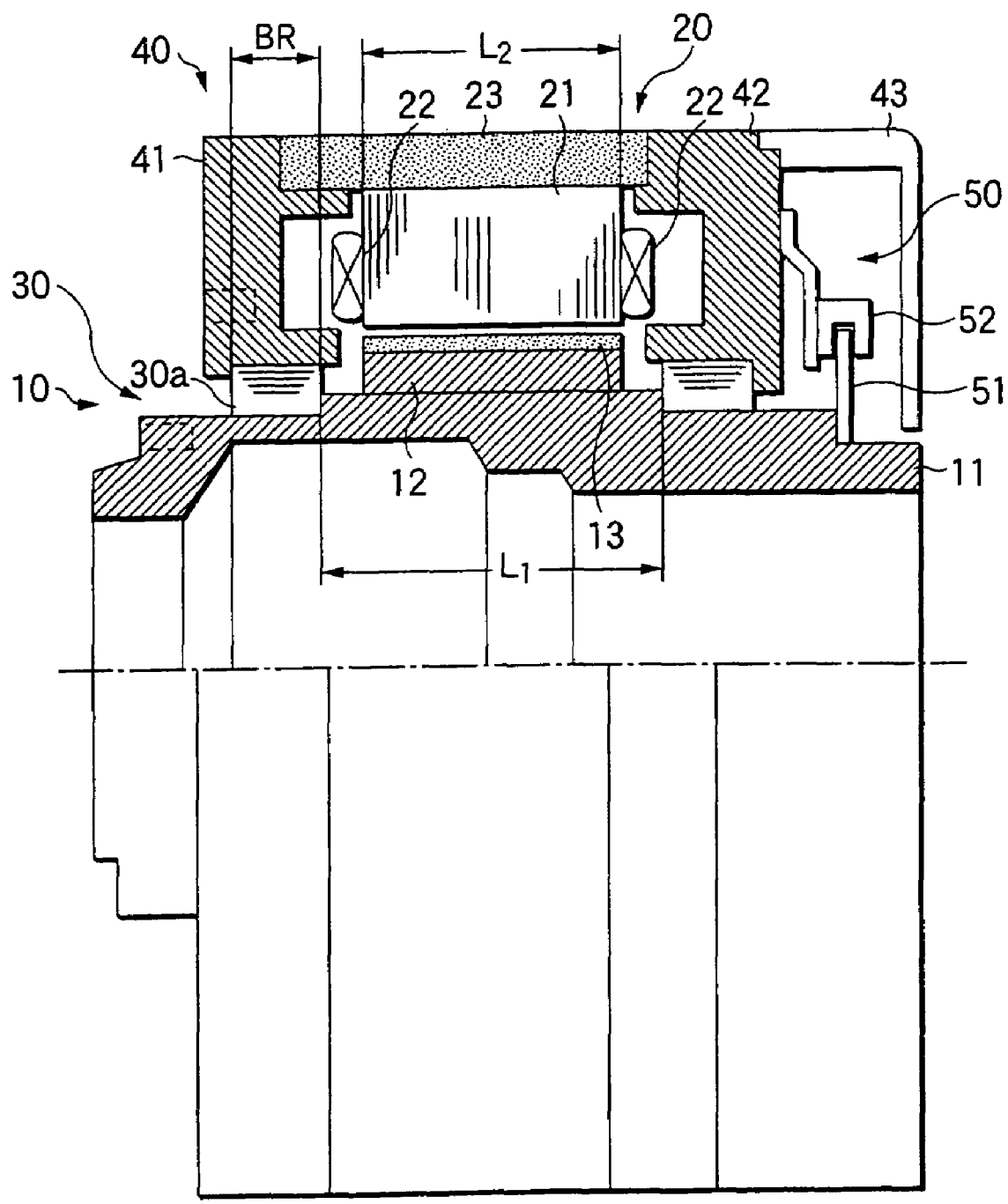
FIG. 17 is a partial cross-sectional view explaining an example of a conventional motor.
Figure 18:
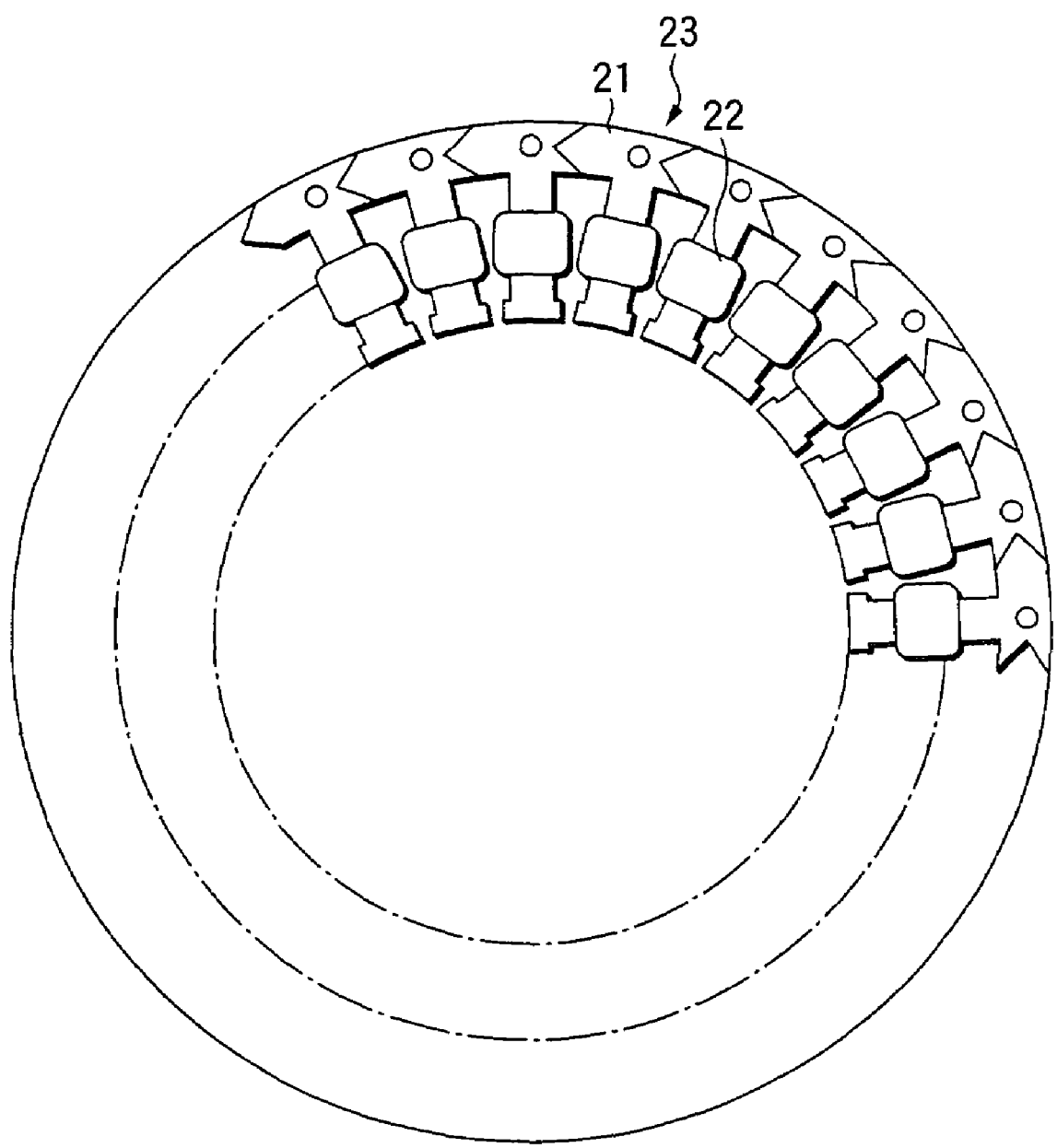
FIG. 18 is an explanatory diagram explaining another example of a stator using split cores.
Figure 19:
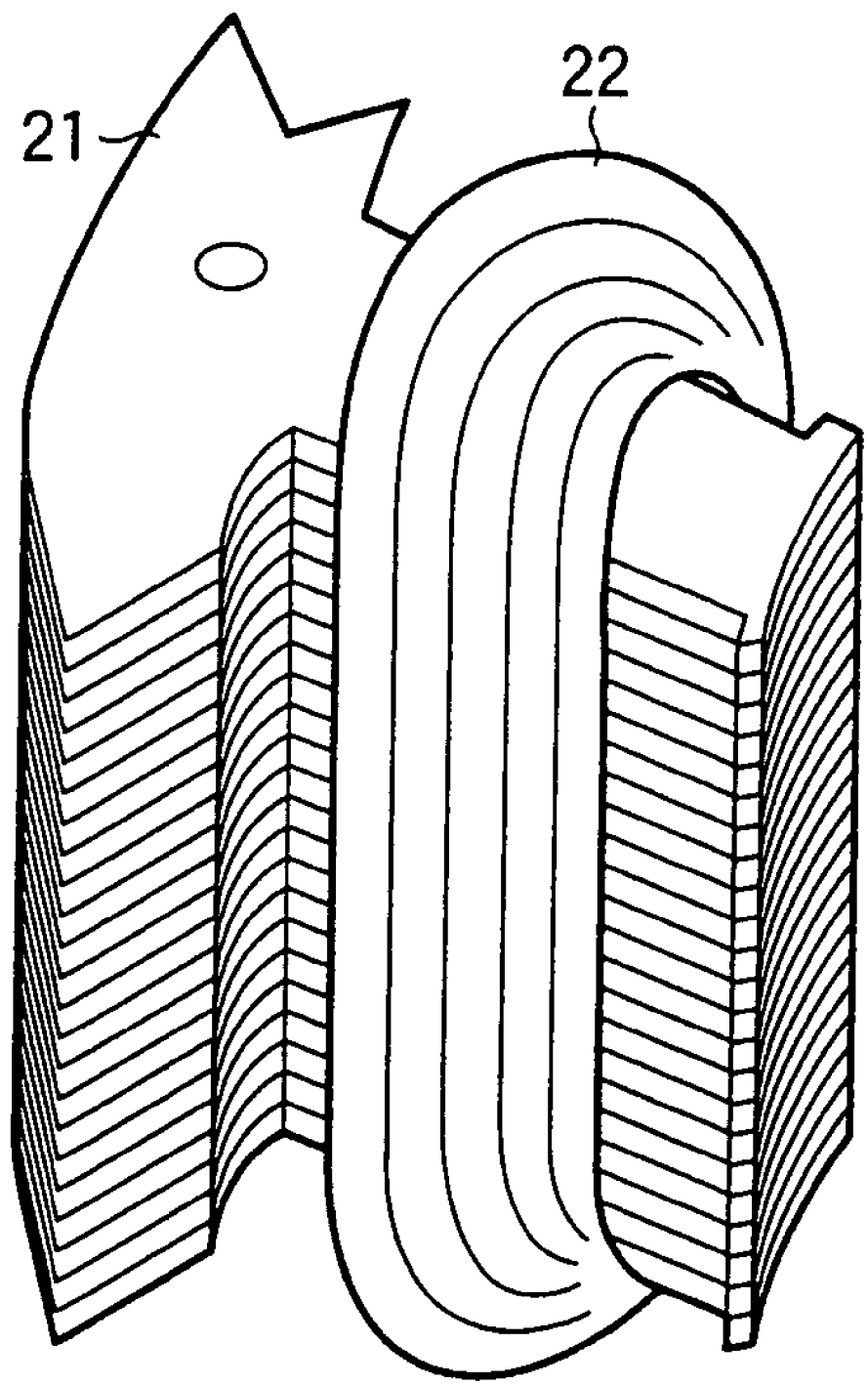
FIG. 19 is a perspective view explaining the split cores.

FIG. 1 illustrates a first embodiment of the invention, and portions corresponding to those of the motor shown in FIG. 17 already referred to are denoted by the same reference numerals.

In a first embodiment, a bearing unit 30 is provided on one side of a rotating shaft 11, and this bearing unit 30 is disposed in such a manner as to insert the inner side of magnetic poles (magnet portion) 13 formed on the surface of a tubular portion of a rotor 10 coaxially in the axial direction. Consequently, the arrangement provided is such that the axial dimension of the motor is made short.

This embodiment shows an example in which the invention is applied to a brushless motor 100. The brushless motor 100, if roughly classified, is comprised of the rotor 10, a stator 20, a bearing unit 30, a housing 40, and a detector 50. It should be noted that since a control system for driving the motor does not constitute the gist of the invention, a description thereof will be omitted.

The rotor 10 for generating the rotational torque (power) includes the rotating shaft 11, a magnet holding portion 12, and the magnets 13.

A plurality of stepped portions (portions having different outside diameters) are provided axially on an outer peripheral surface of the rotating shaft 11. When viewed from a left end side toward a right end side in the drawing, a load mounting portion, a left end seal portion, a bearing mounting portion, a magnet-holding-portion mounting portion, a disk mounting portion, and a right end seal portion are formed in the rotating shaft 11. Threaded holes for mounting, for example, a turntable (see FIG. 16 to be referred to later) are formed in the load mounting portion on the left end side of the rotating shaft 11. The rotating shaft 11 is made hollow to pass the piping in a semiconductor manufacturing process and the control wiring of the apparatus to the turntable side and the like. The bearing unit 30 is disposed on the bearing mounting portion whose outside diameter large in the rotating shaft 11.

In this embodiment, the bearing portion 30 is provided on one side of the rotating shaft 11. Further, the bearing portion 30 is mounted between the bearing mounting portion of the rotating shaft 11 and a tubular bearing mounting portion of a housing 40 which will be described later. The bearing portion 30 is constituted by a pair of tapered roller bearings 30a and 30b which are fitted exteriorly over the bearing mounting portion of the rotating shaft 11, and are interiorly fitted to the bearing mounting portion of the housing 40. The tapered roller bearings 30a and 30b are arranged in close proximity to each other so that small-diameter sides of the tapered rollers face each other. The distance L1 between the bearings 30a and 30b is narrower than the distance between bearings, L1, in the conventional construction shown in FIG. 17. By using such tapered roller bearings, when rotating shaft 11 of the motor is vertically installed on a polishing apparatus (see FIG. 16) which will be described later, it is possible to withstand a large thrust load. In addition, when the moment applied to the housing 40 is applied to the portions of the bearings 30a and 30b, it becomes possible to cause this force to act in the direction in which the axial position of the rotating shaft 11 is stabilized by the angle of inclination of the inclined surfaces of the tapered rollers. Hence, the rigidity against the moment load acting in such a manner as to tilt the rotating shaft 11 is high, and this arrangement is effective in reducing the vibration. It should be noted that the bearings may be a combination of cylindrical roller bearings or ball bearings, and are not limited to the tapered roller bearings.

Figure 3:
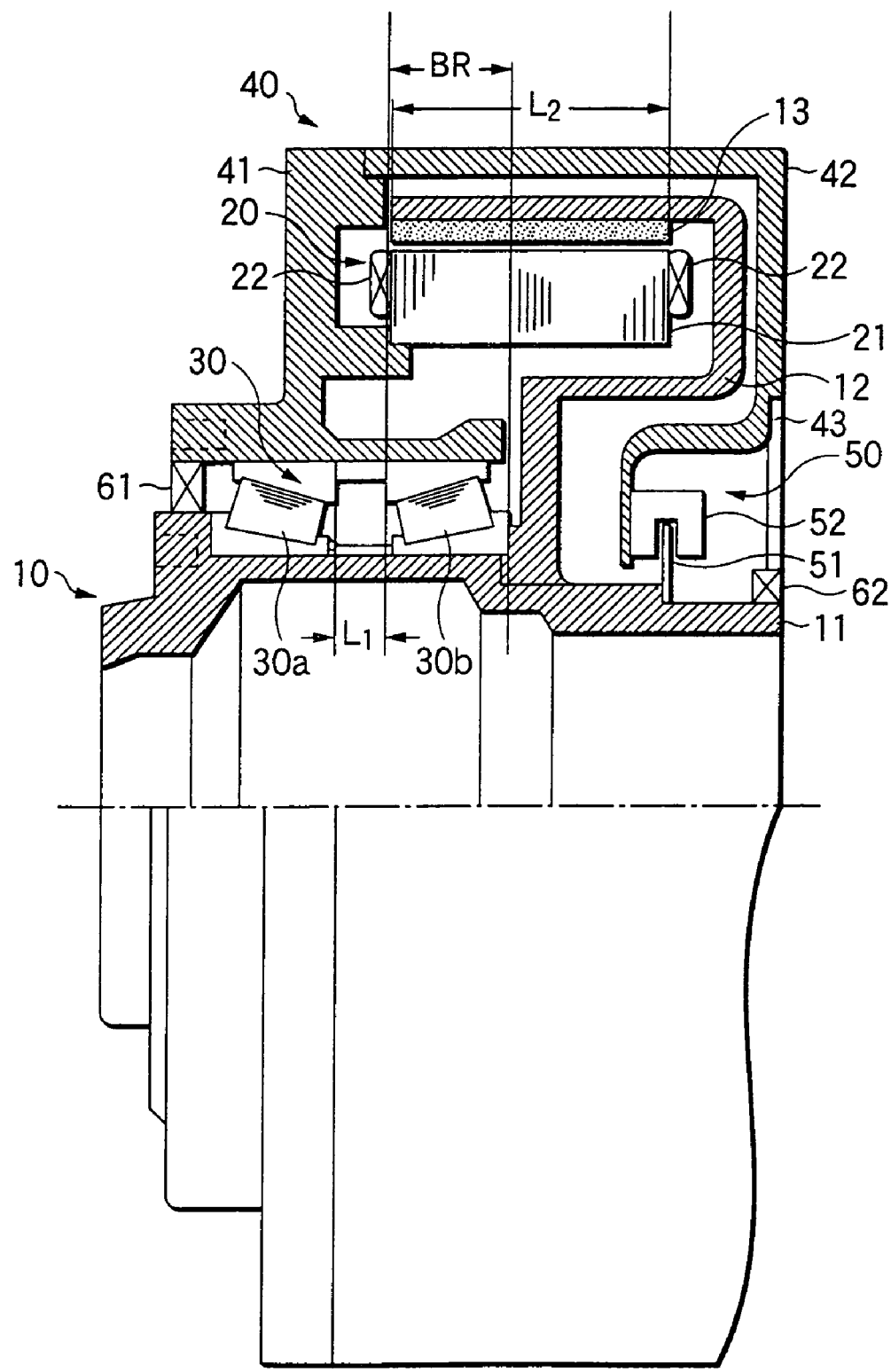
FIG. 3 is a partial cross-sectional view explaining a second embodiment of the invention.

The magnet holding portion 12 whose outer shape is tubular is mounted on the magnet-holding-portion mounting portion which is adjacent to the bearing mounting portion of the rotating shaft 11. As for the magnet holding portion 12, various shapes are conceivable including one whose axial cross-sectional shape (upper shape) is a "T" shape as in the illustrated case, as well as a "hook" shape which is shown in FIG. 3 to be referred to later, an "inverse L" shape, a horizontal "U" shape, a "J" shape, and a horizontal "H" shape, for example. By adopting a shape having a space in the inside, the bearing portion 30 can be positioned on the inner side of the magnet holding portion 12 (or the magnet portion 13) formed with a tubular outer shape coaxially in the axial direction. Consequently, it is compatible of generating a large torque and shortening the length of the motor.

This means that, as shown in FIG. 1, the axial width BR of the bearing 30b or the axial width of the bearing unit 30 partially or wholly axially overlaps with the axial width L2 of the magnet holding portion 12 (or the magnet portion 13). In addition, the distance between the bearings, L1<the width L2 of the magnet. The magnet portion 13 is held on the outer periphery of this tubular magnet holding portion 12.

The magnet portion 13 forms an annular magnet as unit magnetic poles of the N pole or S pole extending in the axial direction of the rotating shaft 11 are alternately arranged in the circumferential direction. The magnet portion 13 can be formed by a single multipolar annular magnet. In addition, the magnet portion 13 may also be formed by a plurality of permanent magnets. If permanent magnets are used as the magnets, the configuration of the apparatus can be simplified. In this case, although it is possible to use various types of permanent magnets, rare-earth magnets, e.g., a samarium-cobalt magnet and a neodymium-iron-boron magnet, which make it possible to obtain a high magnetic flux density, are particularly preferable. In addition, the magnet portion 13 is for generating the torque by the magnetic force acting with the stator magnet, and may be formed by squirrel-cage type windings.

The stator is formed in such a manner as to surround the magnet portion 13 of the rotor 10, and generates a rotating magnetic field for turning the rotor 10. This stator 20 is formed by cores 21 in which thin sheets such as silicon steel sheets are laminated, windings 22 wound around the cores 21 to generate the magnetic field, a yoke 23 for holding the core 21, and so on. The stator 20 is fixed to the housing 40.

Figure 2:
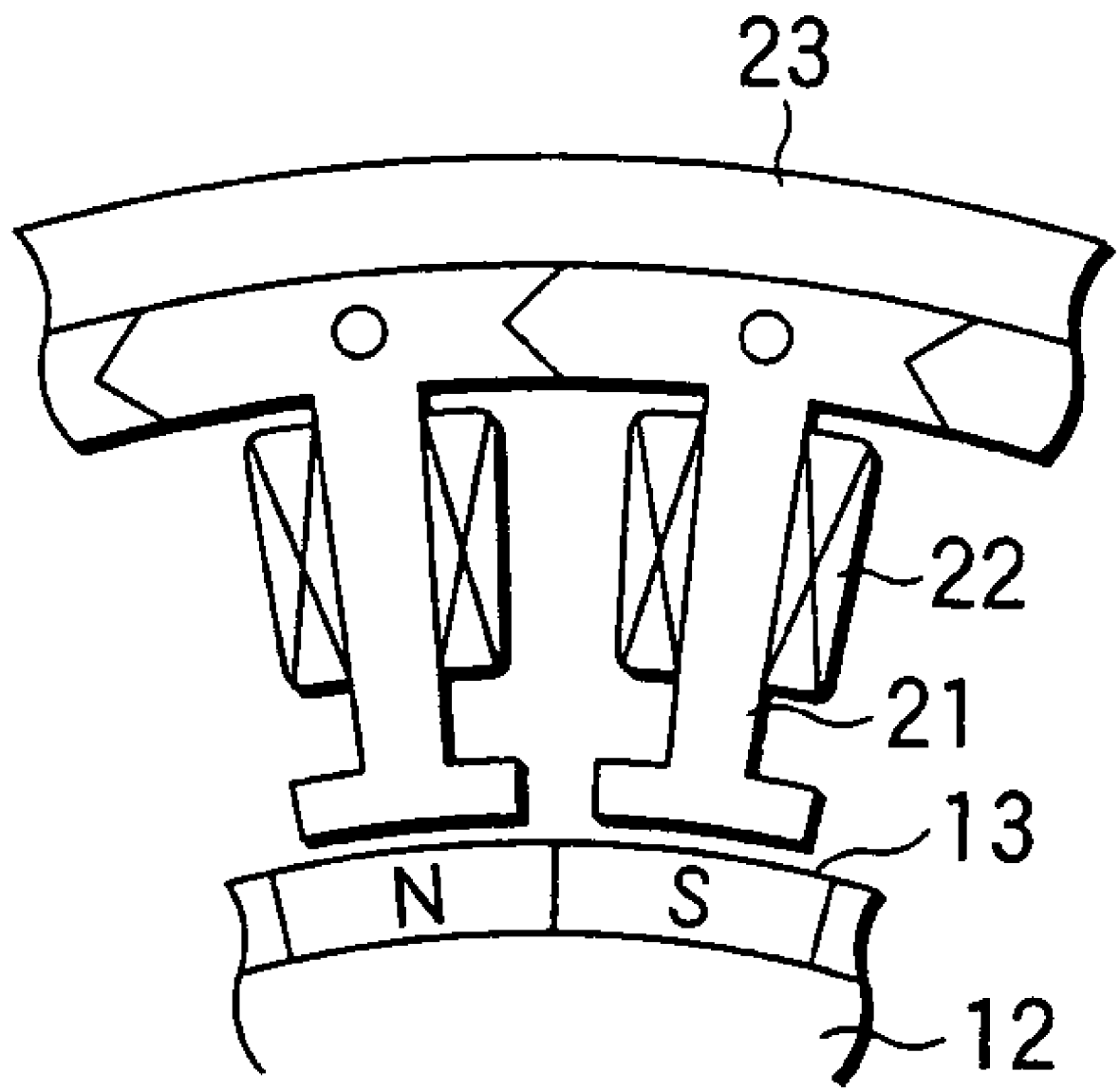
FIG. 2 is an explanatory diagram explaining a stator in accordance with the first embodiment of the invention.

FIG. 2 is an explanatory diagram illustrating a cross section of the magnet holding portion 12, the magnet portion 13, and the core 21 in a plane perpendicular to the axial direction of the rotating shaft 11. The N pole and the S pole are alternately arranged on the surface of the magnet portion 13 in the circumferential direction. The cores 21 are formed by assembling "T" shaped split cores into an annular shape, and are fixed to the yoke. Consequently, the amount of winding is increased and the assembly is facilitated.

The housing 40 is a casing of the motor. The housing 40 includes a left housing 41, a right housing 42, and a right cover 43, and the like. The left housing 41 and the right housing 42 hold the yoke on the stator 20. As described before, the left housing 41 is provided with a tubular bearing supporting portion along the rotating shaft 11.

The left housing 41 rotatably supports the rotating shaft 11 through the bearing unit (the left bearing 30a and the right bearing 30b) mounted on the bearing supporting portion, such that the clearance between the pole face 13 of the rotor 10 and an end face of the stator core 21 opposing thereto assumes a predetermined air-gap length (see FIG. 2). The gap between the rotating shaft 11 and the bearing supporting portion of the left housing 41 at the side surface of bearing unit 30 is shielded by a seal member 61 to prevent the entry of dust or water.

In this embodiment, unlike the example shown in FIG. 17, the right housing 42 is not provided with the bearing 30b. A vertically cross-sectional longitudinal portion of the right housing 42 is formed in a recessed shape such that the housing 42 enters the inner side of the tubular magnet holding portion 12, which is formed in the cross-sectional "T" shape, along the rotating shaft 11. The position detecting encoder 50 for detecting the rotational position of the rotor 12 is disposed in this recessed portion.

The position detecting encoder 50 includes a disk 51 attached to the rotating shaft 11 and a detecting head 52 provided at one spot on the circumference of the right housing 42 (an inner periphery of the right housing in the vicinity of the rotating shaft 11). In the disk 51, markers are formed by a row of a multiplicity of holes formed at equal intervals, or a multiplicity of teeth or magnets (in the case where a sensor and Hall elements or the like are used) formed on the outer periphery, or the like. As for the detecting head 52, it is possible to use a combination of an optical sensor and a photodiode, a Hall element, a magnetic sensor, or the like. A pulse signal outputted from the position detecting encoder 50 is supplied to an unillustrated controller, and is used for controlling the rotation of the motor.

The recessed portion of the right housing 42 is shielded by the cover 43 attached to the housing 42 as well as a seal member 62 provided between the cover 43 and the rotating shaft 11. Consequently, the entry of dust or water into the interior of the motor is prevented.

With the brushless motor thus constructed, since the bearing portion 30 is arranged to enter the inner side of the tubular members 12 and 13 for generating the torque of the rotor 10, the length of the rotating shaft 11 can be made short, so that the axial dimension of the motor is made short.

FIG. 3 shows a second embodiment of the invention. In the drawing, portions corresponding to those of the example shown in FIG. 1 are denoted by the same reference numerals, and a description of such portions will be omitted.

In contrast to the fact that, in the first embodiment, the construction provided is such that the bearings, the annularly disposed magnets, and the annularly disposed windings are arranged in that order in the radial direction as viewed from the rotating shaft in the radially outward direction, in this second embodiment, the bearings, the annularly disposed windings, and the annularly disposed magnets are arranged in that order as viewed from the rotating shaft in the radially outward direction.

For this reason, the axial upper-side cross section of the magnet holding portion 12 having a tubular outer shape is formed in a "hook" shape, and the magnet portion 13 is disposed annularly on the inner peripheral surface side of the tubular portion. The cores 21 of the stator 20 are disposed in face-to-face relation to this magnet portion 13. The cores 21 are fixed to the left housing 41.

In the second embodiment, since the magnet portion 13 is located on the radially outward side of the cores 21, the distance (diameter) of the magnet portion 13 for generating torque from the rotating shaft is made long. Even with the same motor size as in the case of the first embodiment, it becomes possible to obtain a greater torque. This is suitable in the case where a large torque is required and it suffices if speed control of fixed rotation can be effected, as in the case of a polishing apparatus.

It should be noted that in a case where precise position control of the motor 10 is required, and emphasis is placed on lower moment of inertia, it is possible to adopt the construction of the above-described first embodiment or the remaining embodiments (except for the eleventh embodiment) which will be described below.

Figure 4:
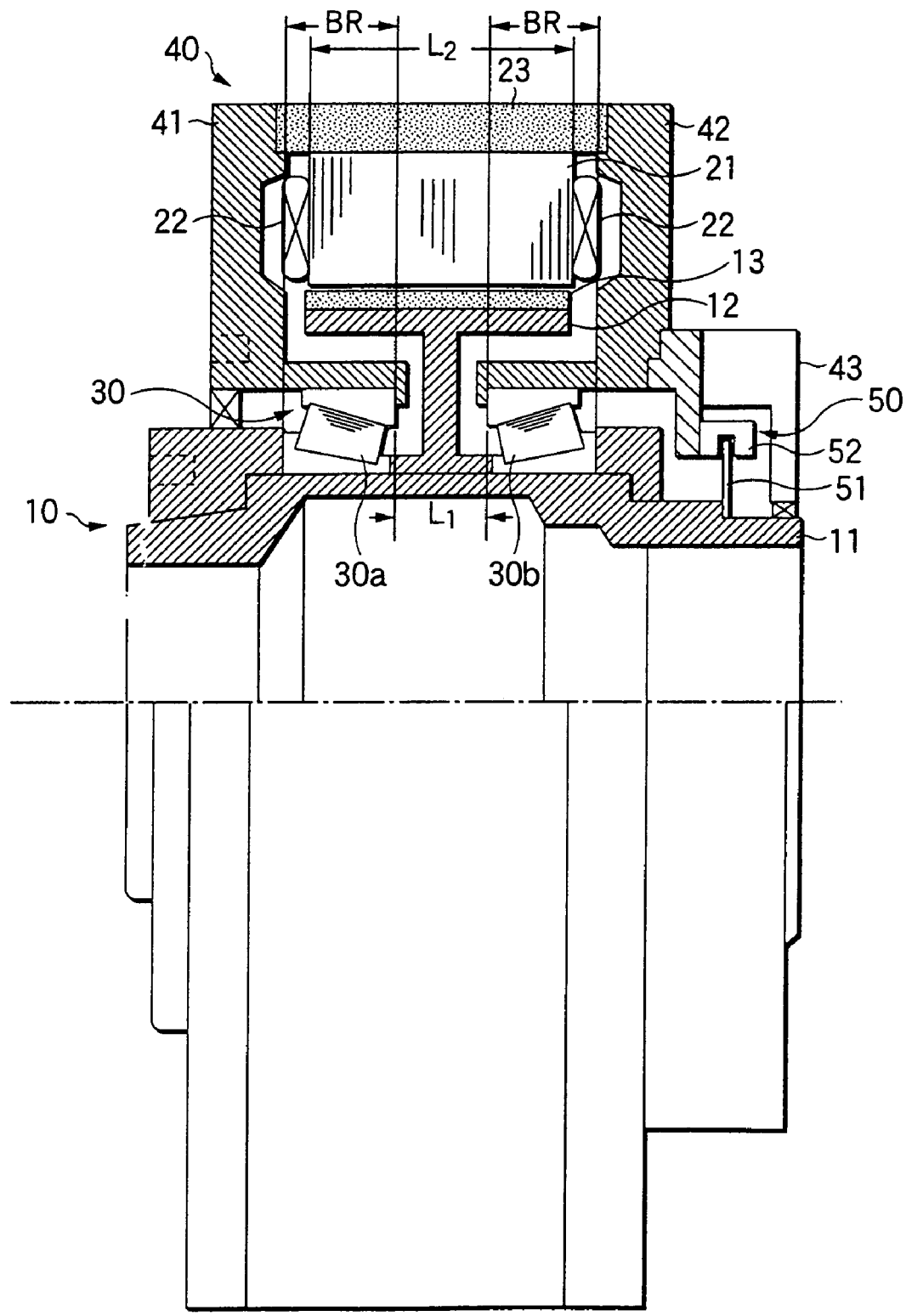
FIG. 4 is a partial cross-sectional view explaining a third embodiment of the invention.

FIG. 4 shows a third embodiment of the invention. In the drawing, portions corresponding to those of the example shown in FIG. 1 are denoted by the same reference numerals, and a description of such portions will be omitted.

In this third embodiment, in the same way as the first embodiment, the axial upper-side cross-sectional shape of the magnet holding portion 12 having a tubular outer shape is formed in the "T" shape, and the magnet portion 13 is disposed annularly on the outer peripheral surface side of the tubular portion. The respective bearing supporting portions of the left and right housings 41 and 42 enter the inner side of the tubular portion of the magnet holding portion 12 from both sides. The bearing portion 30 is disposed on these bearing supporting portions. In this embodiment, the pair of bearings 30a and 30b are respectively mounted on the bearing supporting portions with the magnet holding portion 12 placed therebetween, so as to axially support the rotating shaft 11.

In the third embodiment as well, since the bearing portion 30 is arranged in such a manner as to enter the inner side of the tubular members 12 and 13 for generating the torque of the rotor 10, the length of the rotating shaft 11 is made short, and the axial dimension of the motor becomes short. In addition, since the arrangement adopted is such that the bearings are disposed on both sides of the magnet holding portion, the rotor 10 can be easily made bilaterally symmetrical in the axial direction as compared with the first embodiment (see FIG. 1), so that a motor with less vibration can be easily obtained.

Concerning the arrangement of the stator 20 in the above-described first embodiment, fourth to eighth embodiments are characterized in that, instead of directly connecting the yoke and the plurality of stator cores with windings provided therearound, an annular member 2 whose outer peripheral surface is finished with high accuracy and which is capable of being fitted to the yoke without distortion is fitted to the stator 20, and that this member 2 is fixed to the yoke. It should be noted that although the member 2 should preferably be a member laminated in the same way as the split cores, the invention is not limited to the same. Further, this arrangement is applied to the stator of the related art shown in FIG. 17.

In addition, with respect to the above-described third embodiment as well, the arrangement of the stator 20 may be altered in the same way as described above.

Figure 5A:
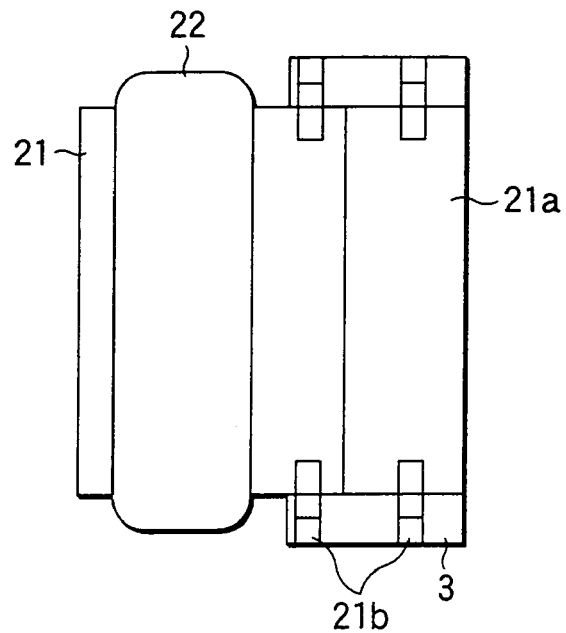
FIG. 5A is an explanatory diagram explaining a plate member 3 fixed to a stator core by means of pins in accordance with the forth embodiment of the invention.
Figure 5B:
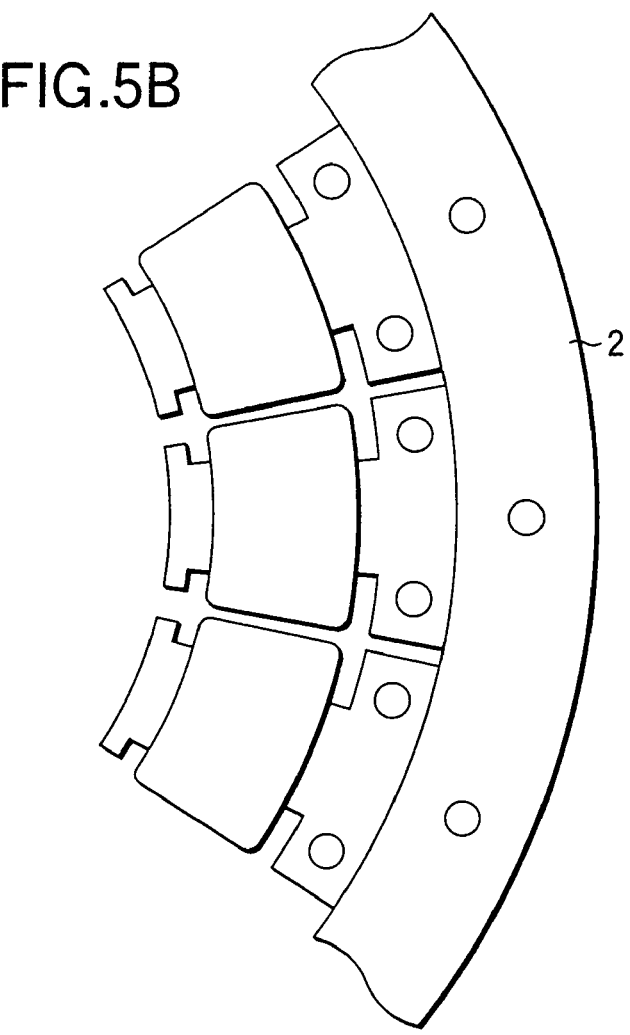
FIG. 5B is an explanatory diagram explaining a stator in accordance with the forth embodiment of the invention.

In the fourth embodiment shown in FIG. 5, the fixation of the split cores and the member 2 is effected from the thrust direction by using a plate member 3 by means of pins, bolts, or the like. This arrangement permits to make adjustment such that the inner peripheral surfaces of the split cores become completely round at the time of the fixation.

Figure 6A:
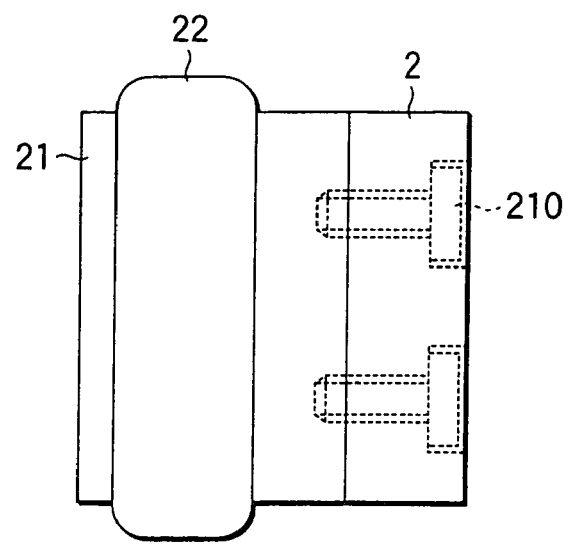
FIG. 6A is an explanatory diagram explaining a plate member 3 fixed to a stator core by means of bolts in accordance with the fifth embodiment of the invention.
Figure 6B:
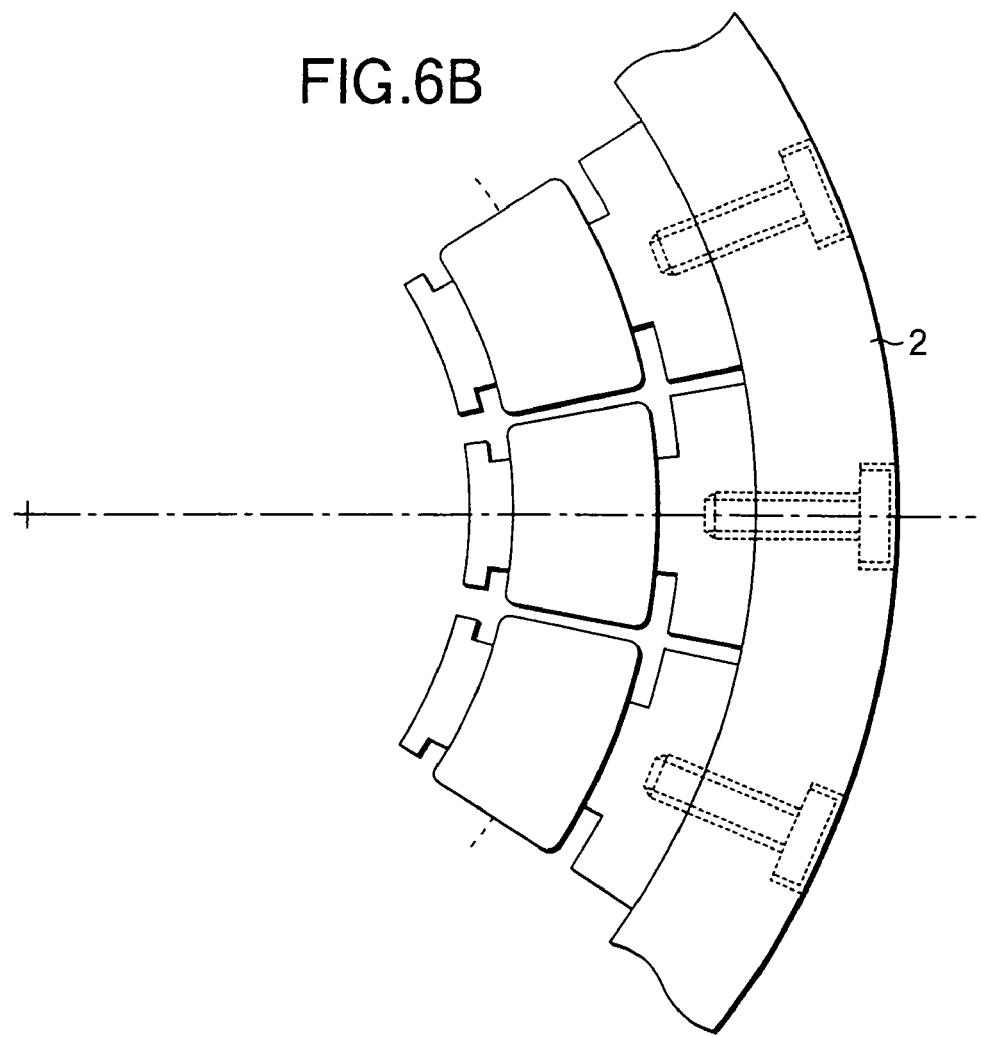
FIG. 6B is an explanatory diagram explaining a stator in accordance with the fifth embodiment of the invention.

In the fifth embodiment shown in FIG. 6, the split cores are bolted to the member 2 from the radially outer side of the member 2.

Figure 7A:
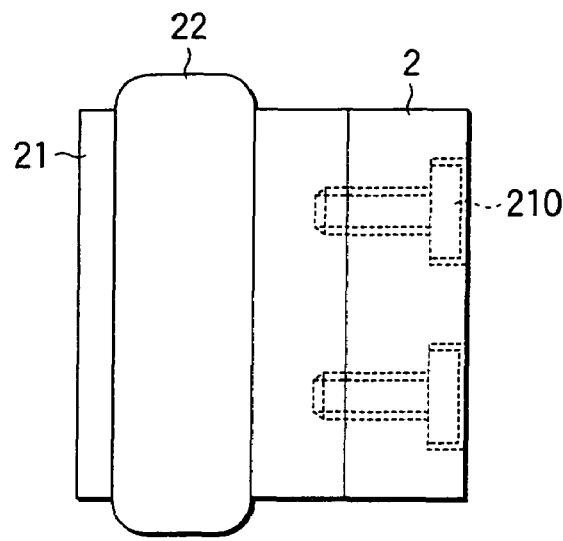
FIG. 7A is an explanatory diagram explaining a plate member 3 fixed to a stator core by means of bolts in accordance with the sixth embodiment of the invention.
Figure 7B:
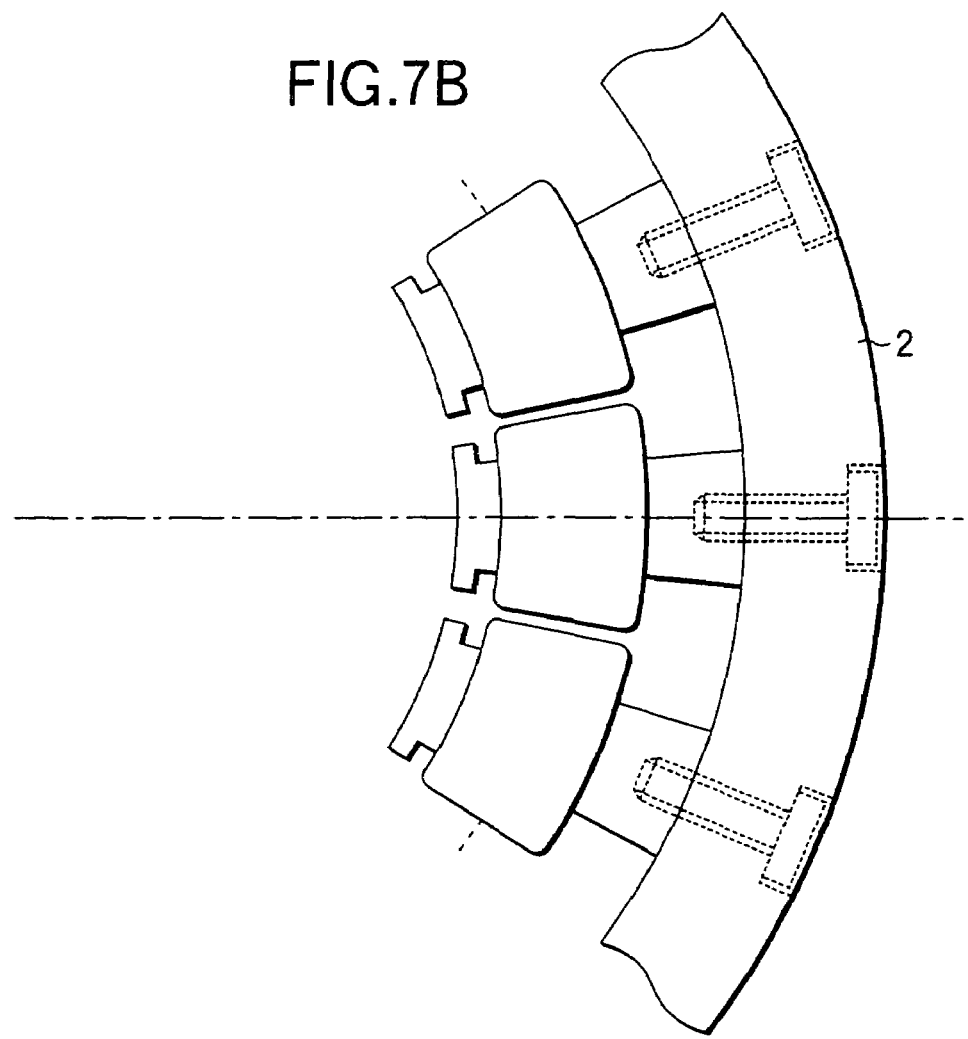
FIG. 7B is an explanatory diagram explaining a stator in accordance with the sixth embodiment of the invention.

In the sixth embodiment shown in FIG. 7, a structure is provided such that the split cores are bolted to the member 2 from the radially outer side of the member 2, and that portions of distal ends of the split cores are fitted in the member 2. As the portions of the distal ends of the split cores are thus fitted, the rigidity increases, and the split cores can be positioned simply.

Figure 8A:
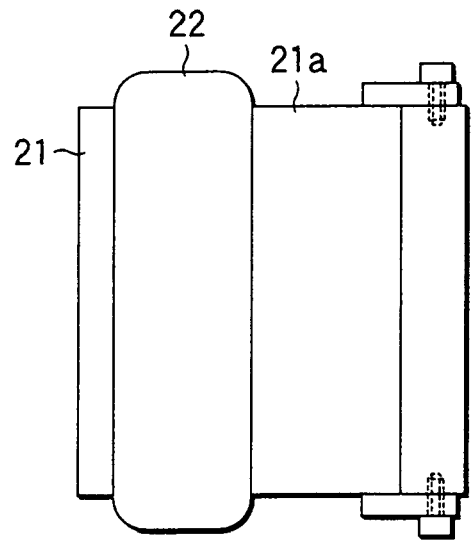
FIG. 8A is an explanatory diagram explaining a plate member 3 inserted to a stator core by means of bolts in accordance with the seventh embodiment of the invention.
Figure 8B:
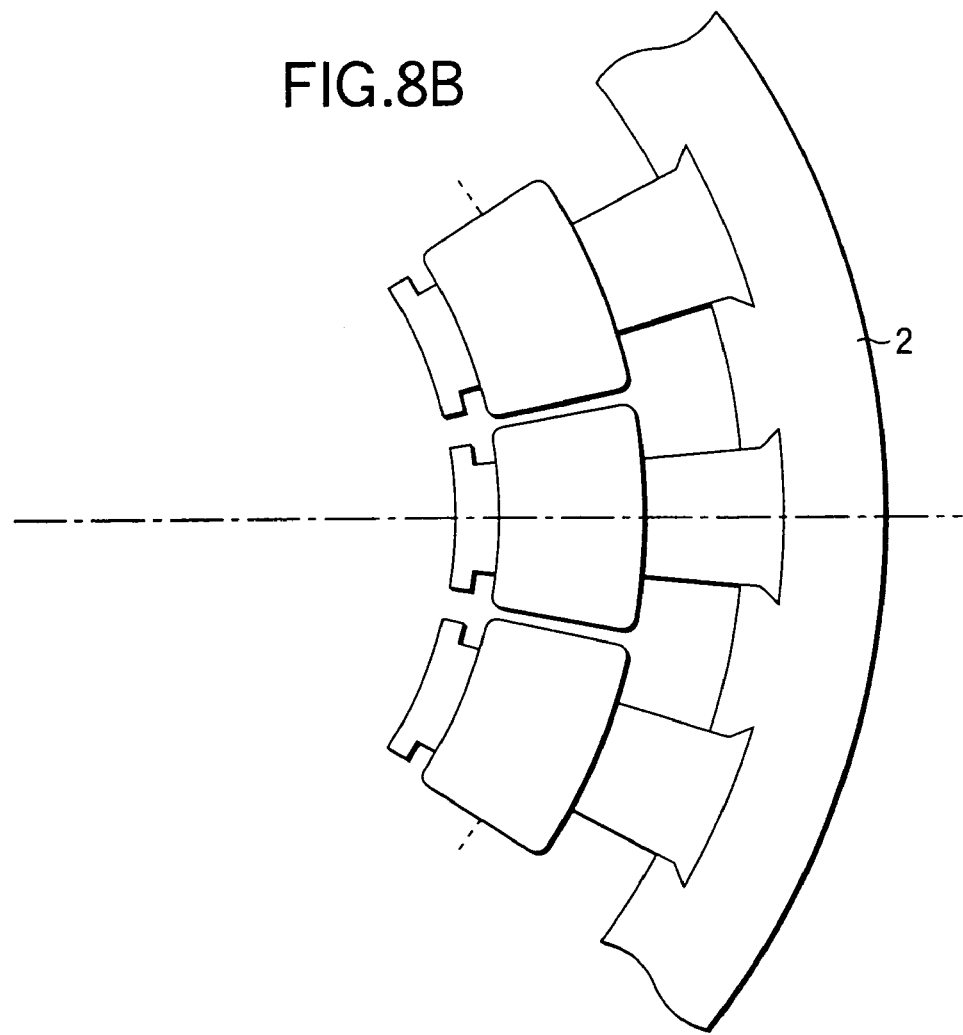
FIG. 8B is an explanatory diagram explaining a stator in accordance with the seventh embodiment of the invention.

In the seventh embodiment shown in FIG. 8, a structure is provided such that portions of distal ends of the split cores are fitted in the member 2, and the shape of each of these fitted portions of the distal ends is hook-shaped. The structure provided is such that when these portions of the distal ends are fitted from the thrust direction, the split cores are restricted in the radial direction, thereby increasing the strength. This configuration also allows the split cores to be easily positioned in the same way as described above.

Figure 9A:
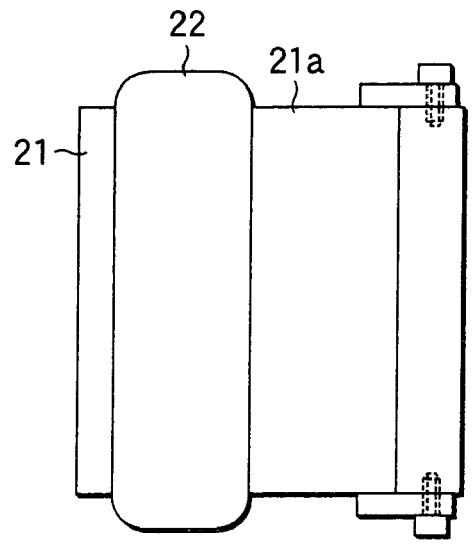
FIG. 9A is an explanatory diagram explaining a plate member 3 inserted to a stator core in accordance with the eighth embodiment of the invention.
Figure 9B:
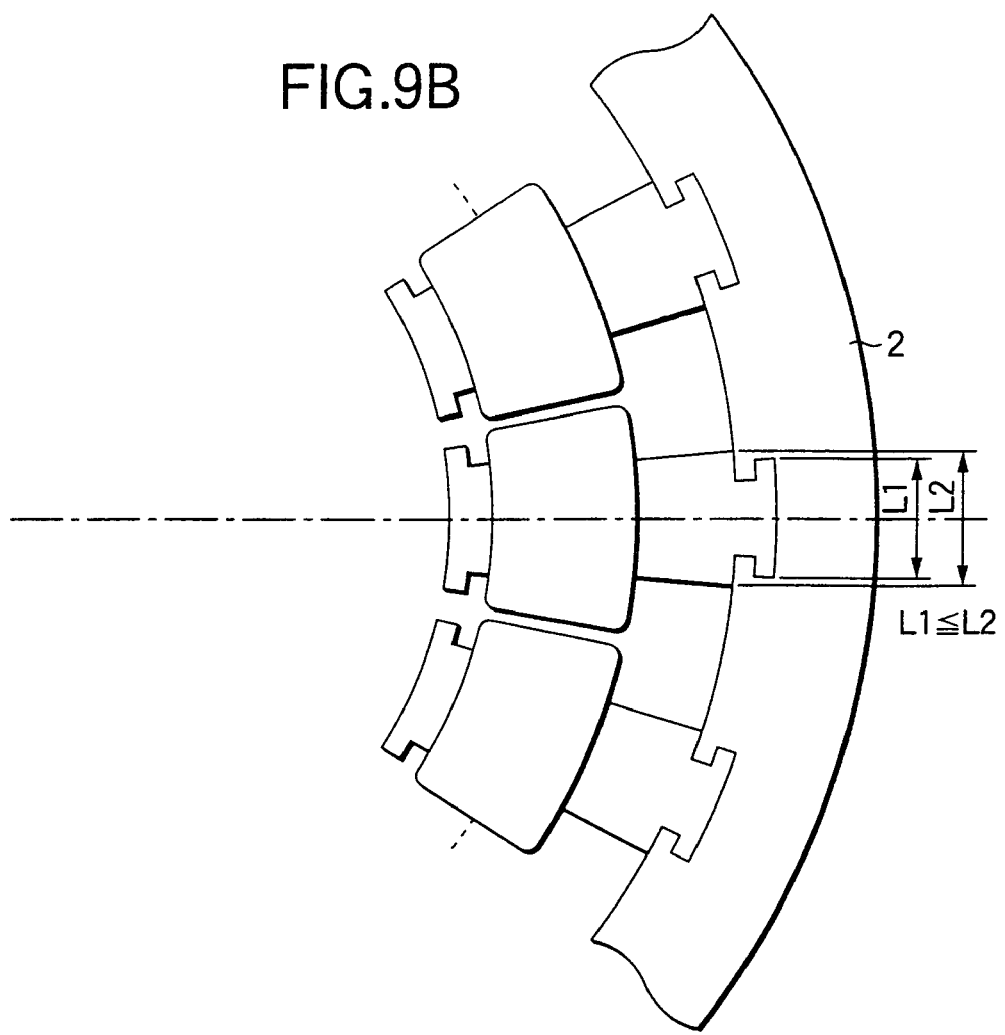
FIG. 9B is an explanatory diagram explaining a stator which has widthwise dimension L2 smaller than L1 in accordance with the eighth embodiment of the invention.

In the eighth embodiment shown in FIG. 9, the geometry of the seventh embodiment is limited. This embodiment is characterized in that the portion which is fitted in the member 2 has a widthwise dimension L1 which is smaller than the widthwise dimension L2 of the split core, as shown in the drawing.

L1·L2

Since the widthwise dimension of the fitted portion is smaller, there is an advantage in that the fitting of coil assemblies, which are formed by the windings, over the cores is made possible. Since this arrangement permits the winding of the windings independently, productivity improves (see FIG. 10).

Figure 11:
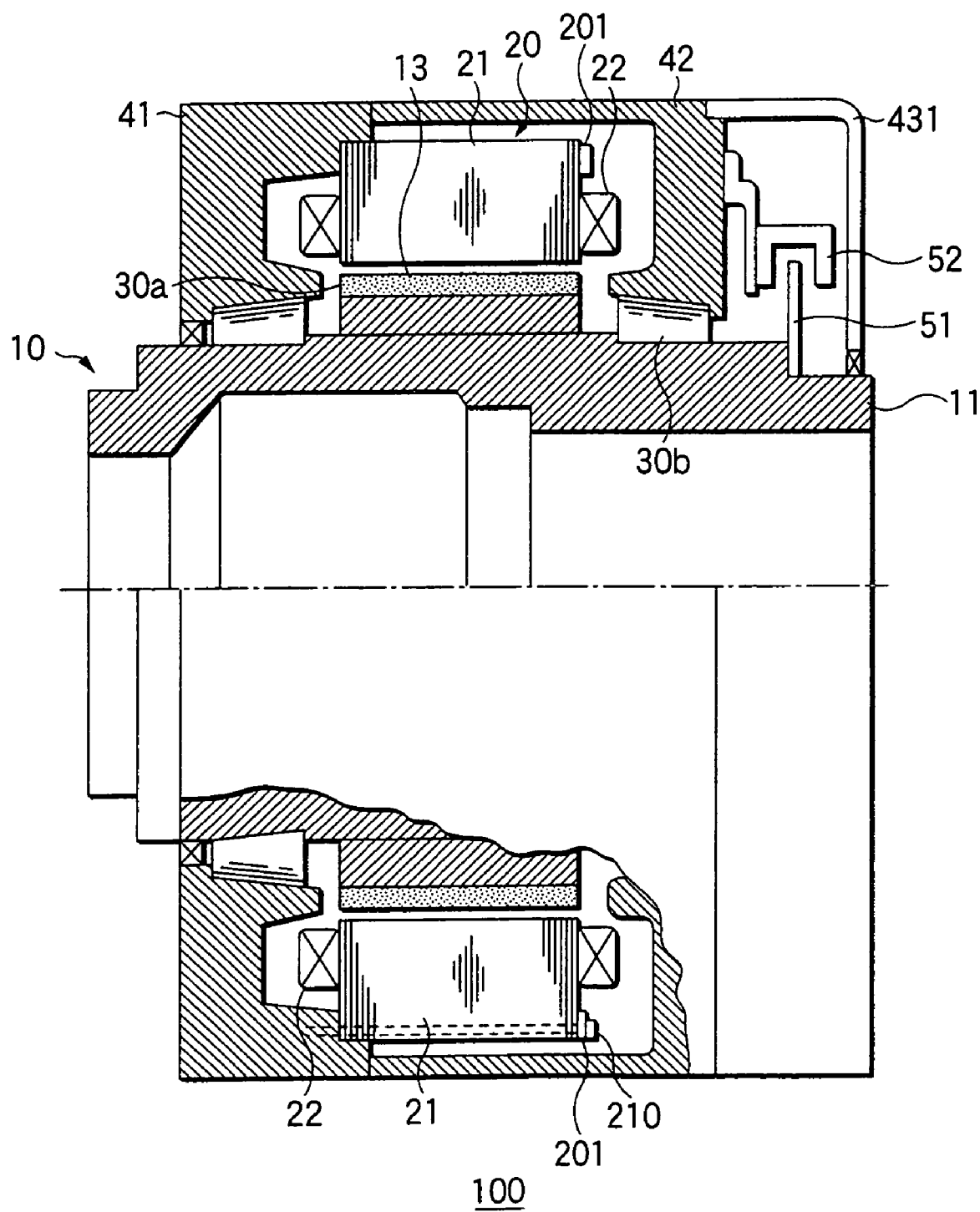
FIG. 11 is a partial cross-sectional view illustrating a ninth embodiment of the invention.

FIG. 11 illustrates a ninth embodiment of the invention, and this embodiment also shows a brushless motor. In the same way as the conventional motor, the brushless motor includes a rotor 10, a stator 20, a left housing 41, and a right housing 42, but a yoke 23 is not provided. Instead of this portion, the right housing 42 extends and covers the interior. The rotor 10 has magnets 13 arranged on an outer periphery of a tubular portion of a rotating shaft 11. In this example, a through hole which passes through in the axial direction is provided in the rotating shaft 11, and the wiring and the piping can be passed through the interior of the shaft. A disk 51 of an encoder for detecting the rotational position is provided on one end portion side of the rotating shaft 11. The stator 20 is formed such that a plurality of split cores, which are wound around cores 21 with windings 22, are arranged in an annular form. The cores is made of laminated silicon steel sheets. The stator 20 is fixed to the inner side of the left housing 41. The left housing 41 and the right housing 42 are coupled with each other, and in cooperation rotatably hold the rotor 10 by means of a pair of bearings 30a, 306, and secure a predetermined gap between the magnets 13 and the stator 20. An encoder head 52 for generating a pulse output by reading a marker on a disk 51 is disposed on an outer side of the right housing 42. The pulse output is supplied to an unillustrated motor controller to determine the position of the rotor. The motor controller controls the current supplied to the respective windings 22 to generate a rotating magnetic field, thereby causing torque to be produced in the magnets 13 and controlling the rotation of the motor.

In this ninth embodiment as well, the stator 20 is formed by assembling the plurality of split cores in an annular form. However, unlike the case shown in FIG. 17, the yoke 23 for holding the stator 20 is not used. The portion where the yoke was conventionally present is covered by the housing 40. The stator 120 assembled in the annular form has its one end face side fitted into the left housing 41, and is fixed to the housing 40 from the other end face side by means of through bolts 210 penetrating the cores 21. At this time, a pressing member for aligning the cores 21 is used. In this example, an annular pressing plate 201 is used as the pressing member. As end faces of the cores 21 which are perpendicular to the rotating shaft 11 are tightened by the bolts 210 via the pressing plate 201, the plurality of cores 21 of the stator 20, whose one ends are otherwise fitted and whose other ends are set to be open ends and tend to expand, can be aligned.

In the state in which the split cores are assembled in an annular form, the annular pressing plate 201 is fixed in advance to the other end faces by bonding or other appropriate means, and as the stator 20 is subsequently fitted to the housing 40, it is possible to easily prevent the distortion of the configuration of the inner peripheral surface of the stator 20 due to the above-described expansion on the other open ends side. Hence, it is possible to uniformly maintain the gap between the inner peripheral surface of the stator 20 and the outer peripheral surface of the magnet 13 of the rotor 10, thereby making it possible to obtain high-accuracy rotation.

In the ninth embodiment, since the arrangement provided is not such that the stator is fitted into the yoke, it suffices if the complete roundness of the inner peripheral side (rotor side) of the stator is ensured, and it is unnecessary to make the outer peripheral side completely round. In addition, since a fixed gap is provided between the rotor 110 and the stator 120, the inner peripheral side (rotor side) of the stator need not be exactly completely round. Hence, the assembly is facilitated.

Figure 12:
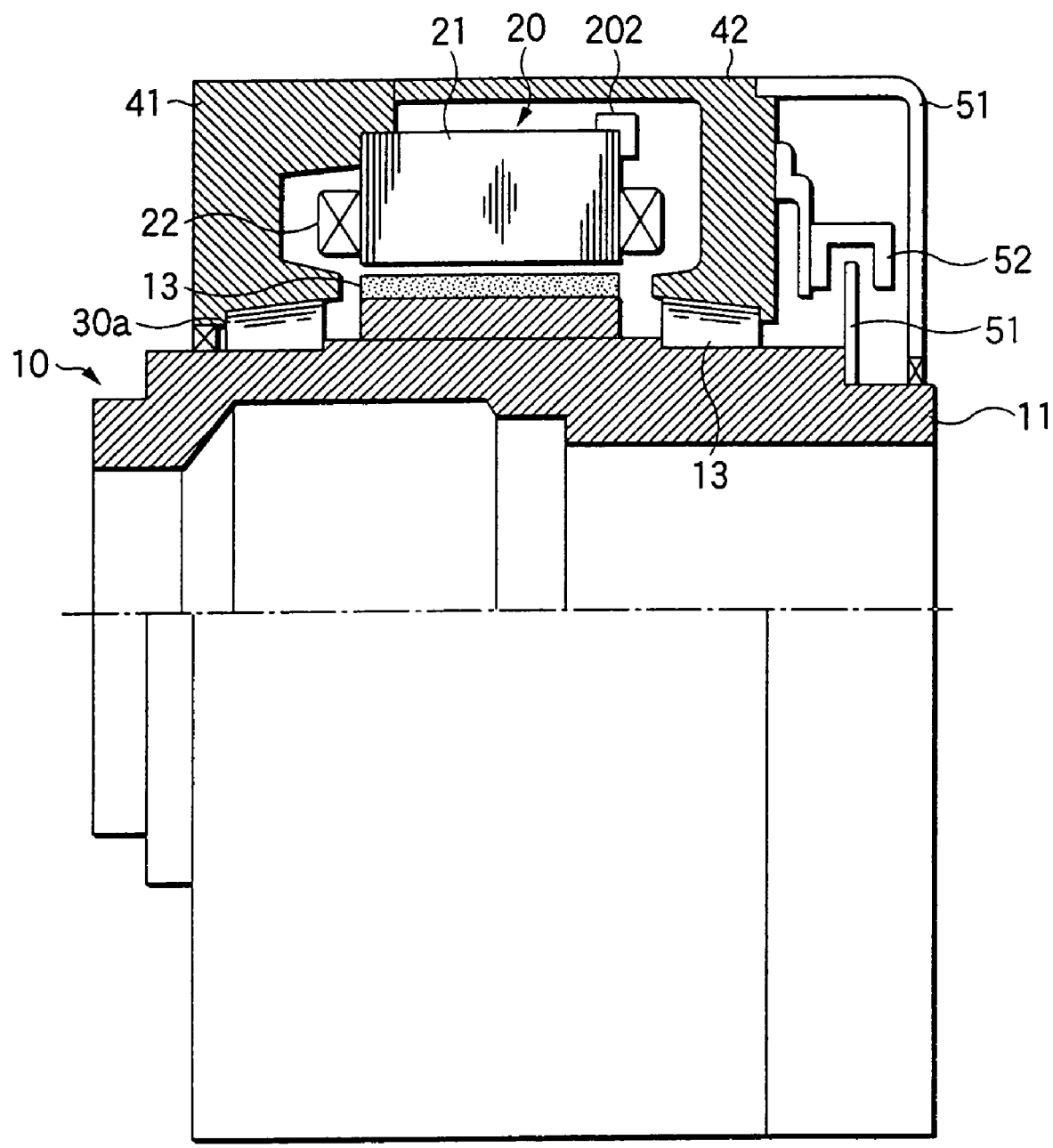
FIG. 12 is a partial cross-sectional view illustrating a tenth embodiment of the invention.

FIG. 12 shows a tenth embodiment. In the drawing, portions corresponding to those of the embodiment shown in FIG. 11 are denoted by the same reference numerals, and a description of such portions will be omitted.

In this embodiment, an annular pressing plate 202 of a substantially "inverse L" shape in cross section is used as the pressing member. By clamping a corner portion (edge) of the end face of the stator 20 by using the L-shaped pressing plate 202, both the end face of the annular stator 20 perpendicular to the rotating shaft 11 and the surface of the stator 20 parallel to the rotating shaft 11 can be pressed.

Figure 13:
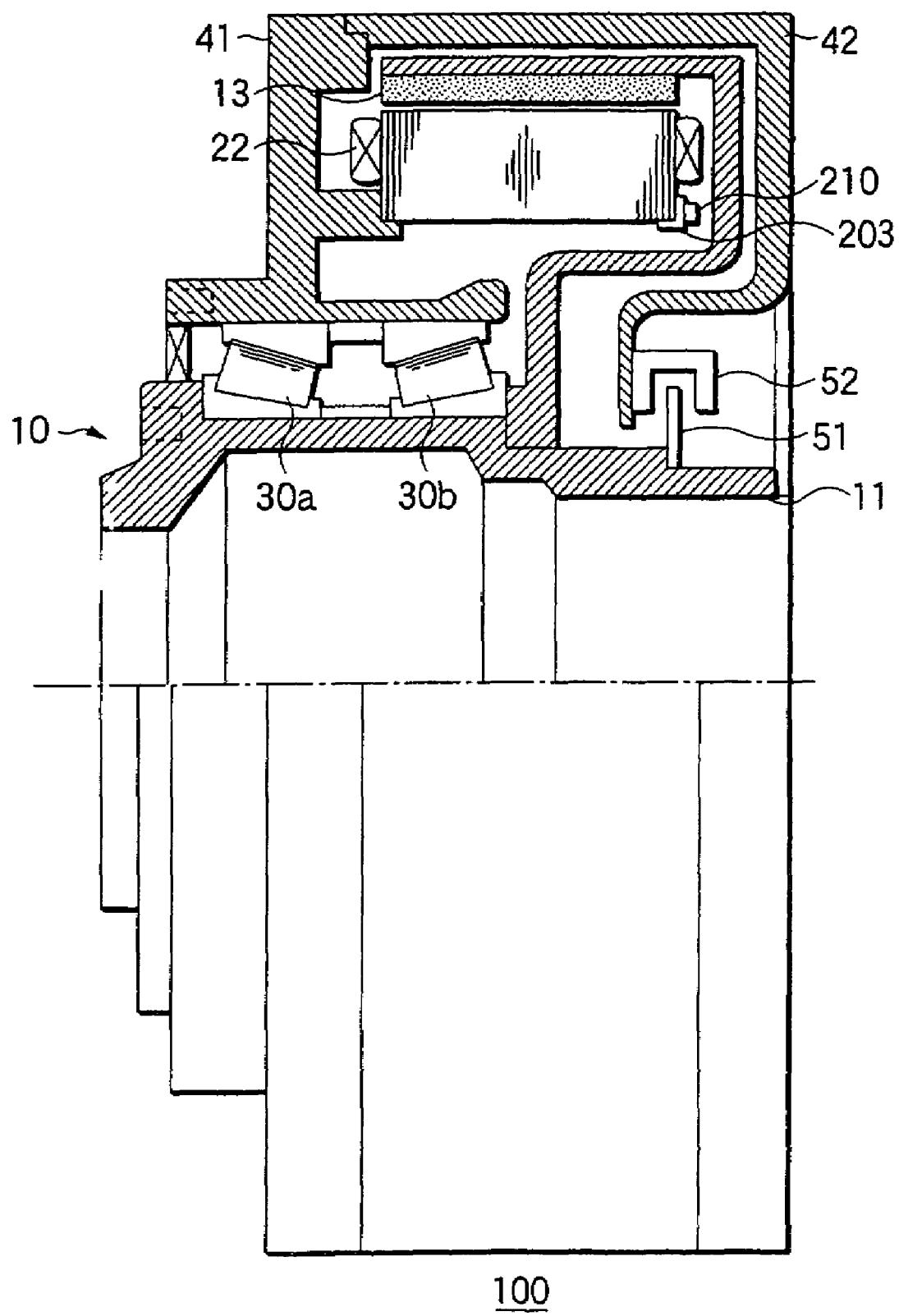
FIG. 13 is a partial cross-sectional view illustrating a eleventh embodiment of the invention.

FIG. 13 shows a eleventh embodiment. In the drawing, portions corresponding to those of the embodiment shown in FIG. 11 are denoted by the same reference numerals, and a description of such portions will be omitted.

In this embodiment, the structure provided is such that the rotor 11 of the motor is supported on one side by the pair of bearings 30a, 30b, and the bearing 30b enters the inner side of the magnet portion 13 of the rotor 11. Accordingly, the axial dimension of the motor is made short. In addition, the magnet portion 13 of the rotor 11 is disposed in such a manner as to be located on the outer side of the stator in the radial direction. Consequently, a greater torque is obtained. With the above-described construction as well, the inner periphery of one end side of the stator 20 can be fitted to an annular projection (mounting portion) of the housing 40, and the stator 120 can be fixed from the other end side of the stator 20 by means of an annular pressing member 13 of an "L" shape in cross section and the through bolts 210.

FIGS. 14A to 14E show various examples of the pressing member.

Figure 14A:
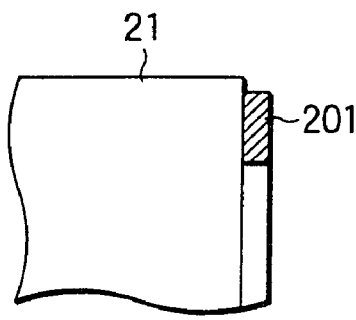
FIG. 14A is showing a "plate-shaped" annular pressing member used in the ninth embodiment.

FIG. 14A shows the "plate-shaped" annular pressing member 201 used in the first embodiment.

Figure 14B:
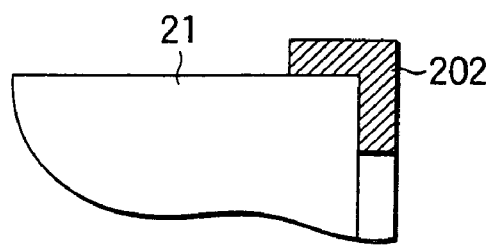
FIG. 14B is showing an annular pressing member with the "L-shaped" cross section.

FIG. 14B shows the annular pressing member 202 with the "L-shaped" cross section used in the second embodiment.

Figure 14C:
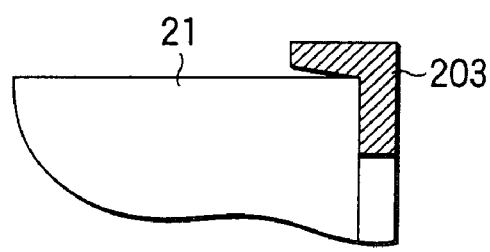
FIG. 14C is showing an annular pressing member with the "L-shaped" cross section.

FIG. 14C shows an example of a pressing member 204 in which a taper is formed in the annular pressing member with the "L-shaped" cross section, and which facilitates the fitting (insertion) to the stator 20.

Figure 14D:
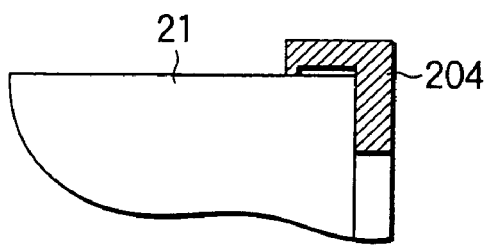
FIG. 14D is showing an annular pressing member with the "L-shaped" cross section.

FIG. 14D shows an example of a pressing member 205 in which a hollow portion is formed in the annular pressing member with the "L-shaped" cross section, so that slight unevenness (variation) of the cores of the stator 20 does not constitute a problem.

Figure 14E:
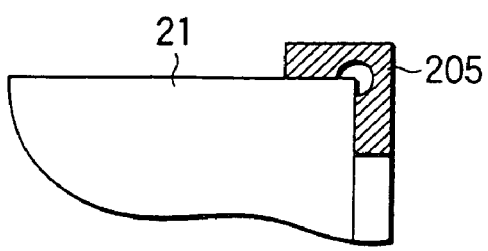
FIG. 14E is showing an annular pressing member with the "L-shaped" cross section.

FIG. 14E shows an example of a pressing member 206 in which, to prevent interference between a corner portion of the annular pressing member with the "L-shaped" cross section and an edge of the end face of the stator 20, a space is provided in that corner portion.

Figure 15:
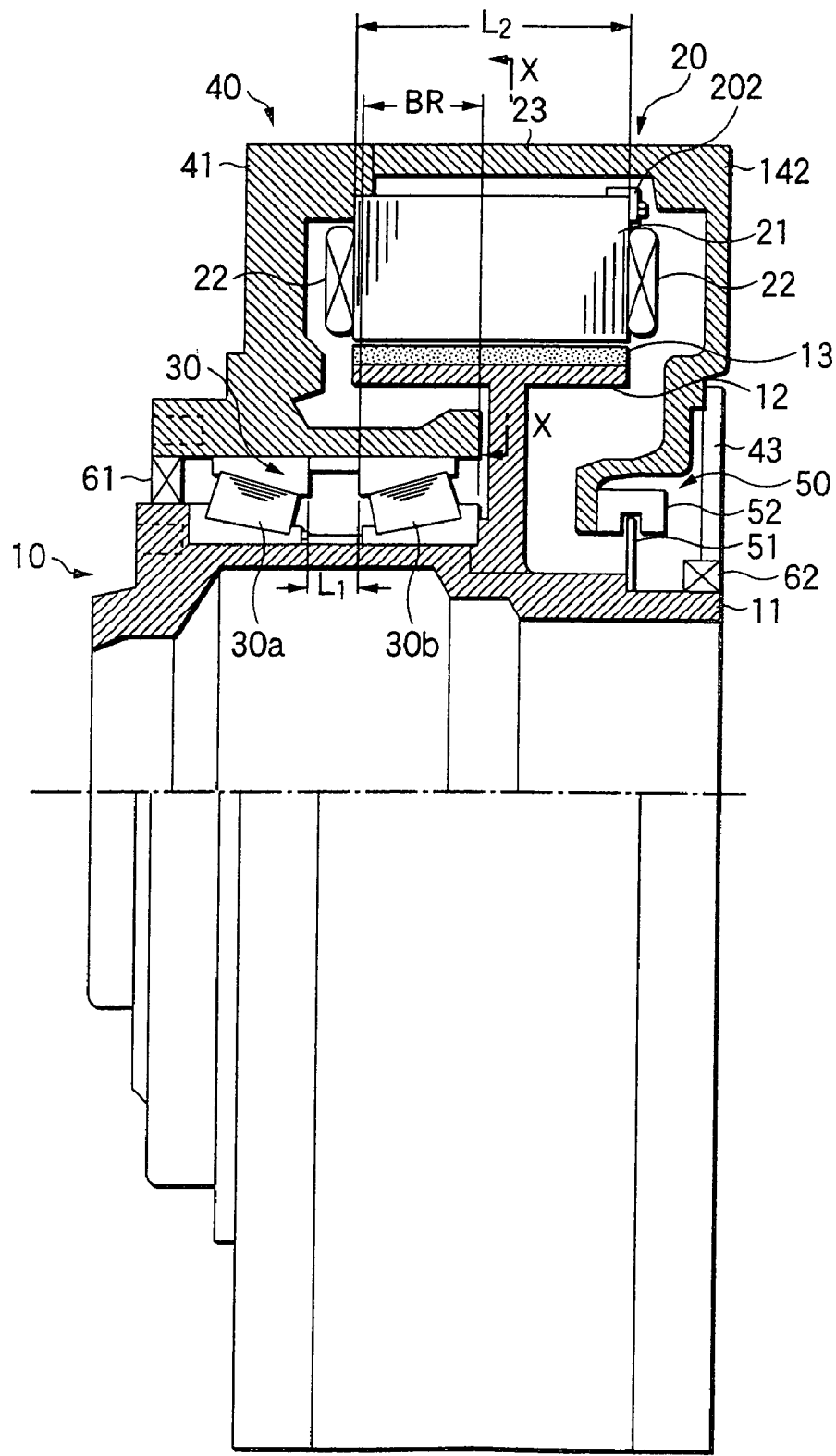
FIG. 15 is an explanatory diagram explaining the twelfth embodiment of the invention.

FIG. 15 is showing a twelfth embodiment. This embodiment combines the tenth embodiment and the first embodiment. In the drawing, portions corresponding to those of the example shown in FIG. 1 are denoted by the same reference numerals, and a description of such portions will be omitted. In this embodiment, the effective of the tenth and first embodiment is simultaneously obtained.

Figure 16:
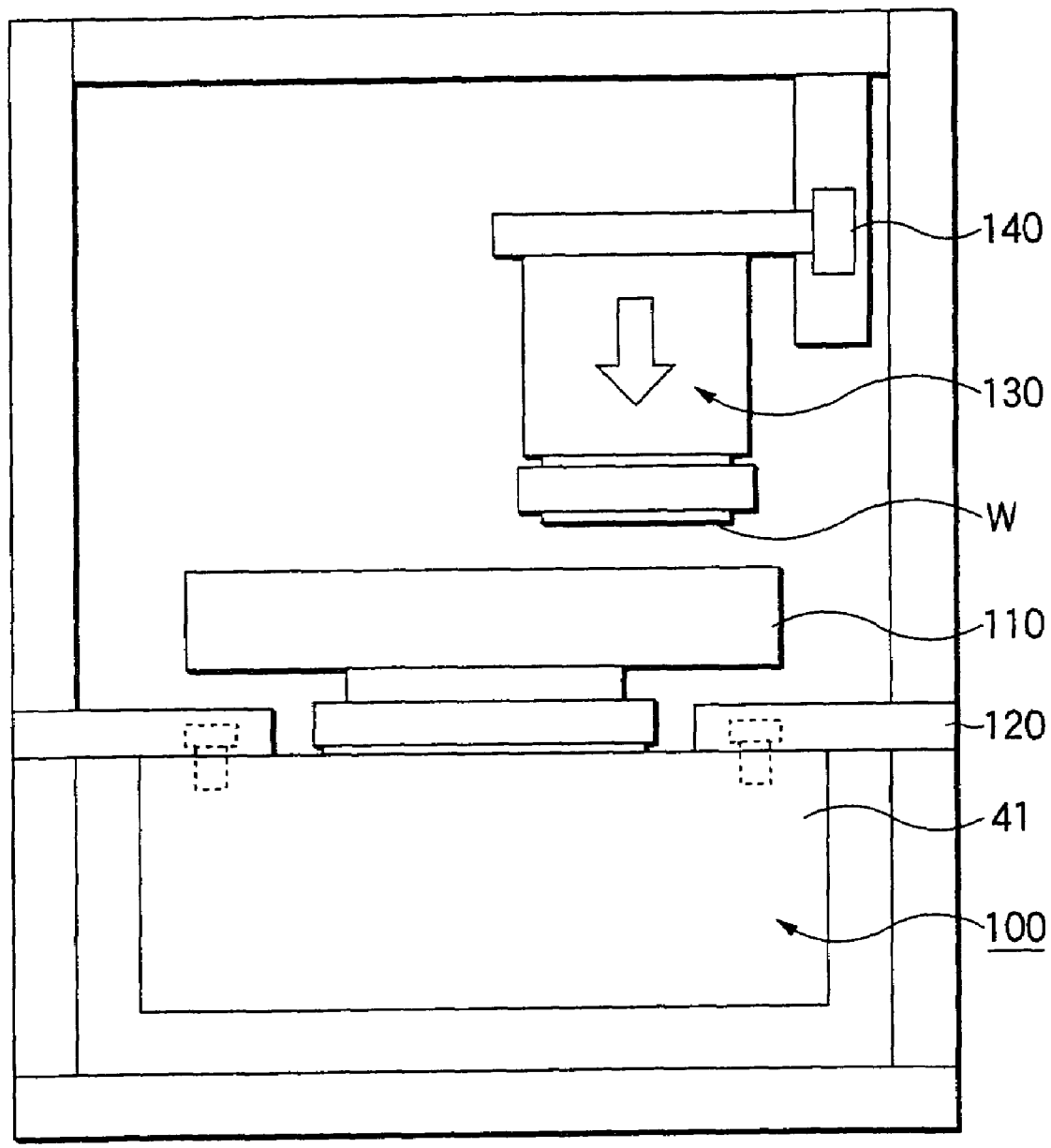
FIG. 16 is an explanatory diagram explaining an example in which the motor in accordance with the invention is used for a semiconductor polishing apparatus.

The polishing apparatus is, for example, a chemical mechanical polishing (CMP) apparatus using a grinding solution (slurry). As shown in FIG. 16, the polishing apparatus is generally comprised of the motor 100 for rotatively driving a turntable 110 for performing the polishing operation, a base frame 120 to which members are fixed, a motor 130 for sucking and rotating a wafer W, a lifting mechanism 140 for raising or lowering the motor 130, and so forth.

The motor in accordance with the invention is used as the turntable motor 100. The motor 100 has its rotating shaft 11 set vertically, and its housing 41 is mounted on the frame 120 by means of mounting bolts. Further, the table 110 is mounted on the rotating shaft 11 to rotatively drive the table 110 by a drive current supplied from an unillustrated controller to the motor 100.

In the above-described construction, the hollow portion of the motor is made to communicate with a polishing pad placed on the turntable 110, and while a slurry is being supplied from an unillustrated pipe, the wafer W is rotated by the motor 130, and the rotating wafer W is pressed against the rotating polishing pad by the lifting mechanism 140 so as to polish the wafer W.

It should be noted that an arrangement may be provided such that the wafer W is held on the upper surface of the turntable 110, and the polishing pad is attached to a distal end of the motor 130.

As described above, in accordance with the embodiments of the invention, the axial dimension of the motor can be made smaller than that of the motor of the conventional construction. In addition, since thrust rigidity is high, the construction is advantageous.

In addition, in the construction in which the bearings are arranged on one side of the rotating shaft, assembly can be effected from one direction, the assembling efficiency of the motor is excellent. Further, since the motor can be disassembled without removing the bearings, the construction excels in maintainability.

In addition, since the space is increased inside the housing and inside the rotor, ventilation improves, so that the cooling characteristic of the motor improves.

It should be noted that although in the embodiments a pair of tapered roller bearings are provided as the layout of the bearings, the invention is not limited to the same. Although the tapered rollers are suitable in that they are capable of withstanding a high thrust load, if the load withstanding performance is appropriate, other types of bearings maybe used. Further, it is possible to use a single or a plurality of bearings, and the invention is not limited to the pair of bearings used in the embodiments.

In addition, although in the embodiments the rear-earth magnet is used for the rotor since it is advantageous in obtaining a high torque, the invention is not limited to the same. For instance, a ferrite magnet or the like may be used. Further, the invention is also applicable to the case of an induction motor which does not use a magnet for the rotor.

As described above, in accordance with the embodiments of the invention, the entire stator is not fitted and held in the yoke, but is merely fitted and fixed to one housing, so that the assembly efficiency improves, and the number of components can be decreased. This construction is particularly advantageous in assembling the split cores which are difficult to be assembled in a completely round form.

In addition, since one end side of the stator is fitted in the housing and is fixed by bolts or the like, and the other end side is pressed by the ring, the rigidity is high, so that the cores can be brought into alignment in the case where the split cores are assembled.

It should be noted that although in the above-described embodiments bolts are used to fix the split cores, fixation may be effected by only bonding, fitting, or the like, for example. In addition, even if the ring (pressing member) for pressing the other end side is not used, it is possible to obtain the advantage that the assembling efficiency can be improved As described above, with the motor of the invention, since the interior or the tubular rotating member on the surface of which magnetic poles are arranged is made hollow, and the bearings for supporting the rotor of the motor are disposed in this space, the axial dimension of the motor can be made short.

As described above, with the motor of the invention, since the structure adopted is such that one end side of the stator is fixed to the housing, and the other end side is provided with the pressing member, as required, to align the cores, even in the case where the slit cores which are difficult to be assembled into a completely round form in terms of their overall shape are used for the stator, the assembling efficiency improves, and the number of component parts can be decreased.

Further, as described-above all embodiments may be applied to the brushless motor 100 is used in the polishing apparatus, as shown in FIG. 16.

What is claimed is:

1. A motor comprising:
   a stator in which a plurality of split cores with windings wound therearound are arranged in an annular form to generate a rotating magnetic field;
   a rotor for generating torque by the rotating magnetic field;
   a housing for fixing the stator and for rotatably holding the rotor at an annularly central position of the stator; and
   a pressing member disposed at the other end side to clamp the split core in cooperation with the housing,
   wherein only one corner of the split cores of the stator is fixed to the housing, and the pressing member is a plate-shaped annular pressing member.

2. A motor comprising:
   a stator in which a plurality of split cores with windings wound therearound are arranged in an annular form to generate a rotating magnetic field;
   a rotor for generating torque by the rotating magnetic field;
   a housing for fixing the stator and for rotatably holding the rotor at an annularly central position of the stator; and
   a pressing member disposed at the other end side to clamp the split core in cooperation with the housing,
   wherein only one corner of the split cores of the stator is fixed to the housing, and the pressing member has an L-shaped cross-section.

3. The motor according to claim 2, wherein the pressing member is provided with a taper.

4. The motor according to claim 2, wherein the pressing member is provided with a hollow portion.

5. The motor according to claim 2, wherein the pressing member is provided with a space.

* * * * *